(12) United States Patent
Masli et al.

(10) Patent No.: US 8,847,781 B2
(45) Date of Patent: Sep. 30, 2014

(54) BUILDING MANAGEMENT SYSTEM WITH PRIVACY-GUARDED ASSISTANCE MECHANISM AND METHOD OF OPERATION THEREOF

(75) Inventors: Hans Masli, Milpitas, CA (US); Chuen-Chien Lee, Pleasanton, CA (US); Alexander Berestov, San Jose, CA (US); Tomofumi Okuda, Cupertino, CA (US); Jeremy Saltzman, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 13/432,702

(22) Filed: Mar. 28, 2012

(65) Prior Publication Data

US 2013/0257626 A1 Oct. 3, 2013

(51) Int. Cl.
*G08B 3/00* (2006.01)

(52) U.S. Cl.
USPC ............... 340/691.6; 340/539.1; 340/539.11; 340/539.13

(58) Field of Classification Search
USPC .................. 340/691.6, 539.1, 539.11, 539.13
See application file for complete search history.

(56) References Cited

U.S. PATENT DOCUMENTS

| | | | |
|---|---|---|---|
| 6,208,905 B1 | 3/2001 | Giddings et al. | |
| 6,735,630 B1 | 5/2004 | Gelvin et al. | |
| 7,689,167 B2 | 3/2010 | Sengupta et al. | |
| 7,884,727 B2 | 2/2011 | Tran | |
| 8,106,782 B2 | 1/2012 | Fredriksson et al. | |
| 8,121,673 B2 | 2/2012 | Tran | |
| 2004/0080618 A1 | 4/2004 | Norris et al. | |
| 2007/0099623 A1* | 5/2007 | Stephensen et al. | 455/446 |
| 2009/0055204 A1 | 2/2009 | Pennington | |
| 2009/0224925 A1 | 9/2009 | Gannot et al. | |
| 2009/0256683 A1* | 10/2009 | Stephenson et al. | 340/10.1 |
| 2010/0262467 A1 | 10/2010 | Barnhill, Jr. et al. | |
| 2011/0046805 A1 | 2/2011 | Bedros et al. | |
| 2011/0093125 A1 | 4/2011 | Schoeman et al. | |

OTHER PUBLICATIONS

NBC Nightly News, "Green+Wired=A 'Smart' Home (Video)", "NBC Nightly News", Publisher: MSNBC, http://www.msnbc.msn.com/id/3032619/vp/24875813#24875813, Downloaded Mar. 28, 2012, pp. 2 pages.
PG&E Corporation, "Flex Your Power Now!", 2011, pp. 1 page.
PG&E Corporation, "Rate Options", 2011, pp. 3 pages.
PG&E Corporation, "SmartMeter", 2011, pp. 2 pages.
Sommer, "In a Sea of Energy Data, Utilities Try to Inspire Conservation", "Quest Science Audio Podcast", Oct. 7, 2011, pp. 3 pages, publisher: KQED Quest.
Sommer, "What Makes Us Conserve Energy? Six Lessons from the Smart Grid", "News Fix: KQED's Bay Area News Blog", Oct. 10, 2011, pp. 3 pages, Publisher: KQED News.

* cited by examiner

*Primary Examiner* — Daryl Pope
(74) *Attorney, Agent, or Firm* — Ishimaru & Associates LLP

(57) ABSTRACT

A method for operating a building management system includes: identifying a movement-pattern from a sensed attribute at a first sensor; determining a behavior-pattern at the first sensor when the movement-pattern matches a template-pattern; transmitting the behavior-pattern and the sensed attribute from the first sensor to a second sensor; and tracking the sensed attribute at the second sensor for displaying on a device.

20 Claims, 7 Drawing Sheets

BUILDING MANAGEMENT SYSTEM WITH PRIVACY-GUARDED ASSISTANCE MECHANISM AND METHOD OF OPERATION THEREOF

CROSS-REFERENCE TO RELATED APPLICATION(S)

The present application contains subject matter related to concurrently filed U.S. patent application Ser. No. 13/432,598. The related application is assigned to Sony Corporation and the subject matter thereof is incorporated herein by reference thereto.

TECHNICAL FIELD

The present invention relates generally to a building management system, and more particularly to a building management system with tracking and data-gathering mechanism.

BACKGROUND ART

As technology advances, users become more empowered and new and old paradigms begin to take advantage of these advancements. Advances in communication, computing, and sensory technology are providing increasing levels of functionality to support modern life including energy conservation and home management.

The ever increasing need for conserving resources, both on global and personal levels, requires users to consider different uses for the tools and services in their daily routines. Users are willing to change their habits and routines to better conserve resources, such as electricity or money. Further, the increasing accessibility of information makes it possible for people to maximize the value of all their resources.

Thus, a need still remains for building management system with tracking and data-gathering mechanism with more features. In view of the diminishing resources and increased desired for safety and accommodation, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method for operating a building management system including: identifying a movement-pattern from a sensed attribute at a first sensor; determining a behavior-pattern at the first sensor when the movement-pattern matches a template-pattern; transmitting the behavior-pattern and the sensed attribute from the first sensor to a second sensor; and tracking the sensed attribute at the second sensor for displaying on a device.

The present invention provides a building management system, including: a detection module for identifying a movement-pattern from a sensed attribute at a first sensor; an activity analysis module, coupled to the detection module, for determining a behavior-pattern at the first sensor when the movement-pattern matches a template-pattern; a sending module, coupled to the activity analysis module, for transmitting the behavior-pattern and the sensed attribute from the first sensor to a second sensor; and a tracking module, coupled to the detection module, for tracking the sensed attribute at the second sensor for displaying on a device.

Certain embodiments of the invention have other aspects in addition to or in place of those mentioned or obvious from the above. The aspects will become apparent to those skilled in the art from a reading of the following detailed description when taken with reference to the accompanying drawings.

BEST MODE FOR CARRYING OUT THE INVENTION

Figure 1:
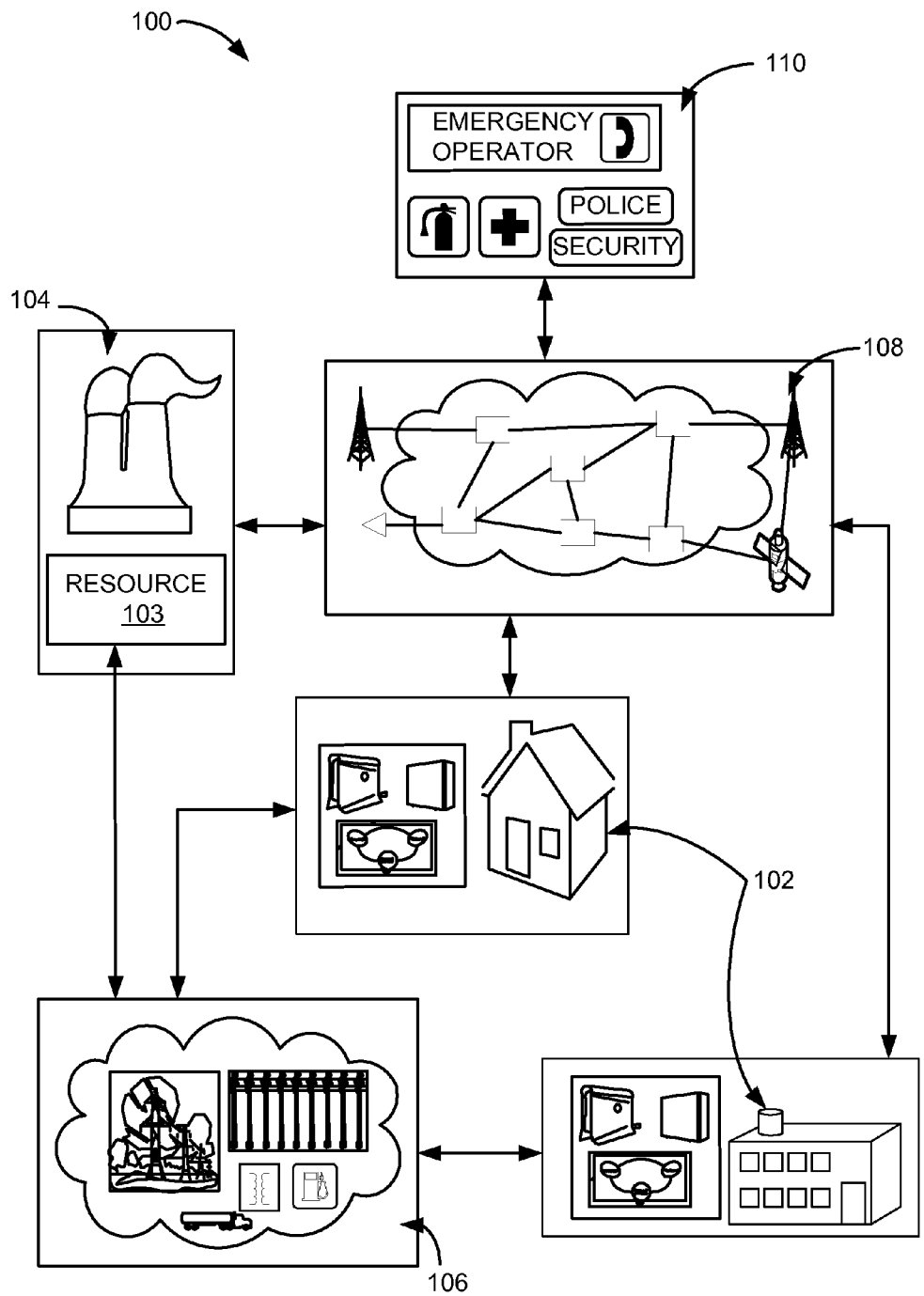
FIG. 1 is a building management system with a privacy-guarded assistance mechanism in an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it will be apparent that the invention can be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Similarly, although the views in the drawings for ease of description generally show similar orientations, this depiction in the FIGs. is arbitrary for the most part. Generally, the invention can be operated in any orientation.

In addition, where multiple embodiments are disclosed and described having some features in common, for clarity and ease of illustration, description, and comprehension thereof, similar and like features one to another will ordinarily be described with like reference numerals.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes assembling data structures, transferring data structures to peripheral storage devices, manipulating data structures, and reading data structures from external sources. Data structures are defined to be files, input data, system generated data, such as calculated data, and program data.

The term "member" as used herein is defined as a person having association with a particular location or with a group. For example, children of the homeowners can be members of the house and employees having required security clearance can be members of a classified area.

Referring now to FIG. 1, therein is shown a building management system 100 with a privacy-guarded assistance mechanism in an embodiment of the present invention. The building management system 100 can include a managed structure 102. A resource supplier 104, a resource distribution network 106, a communication network 108, and an emergency service 110.

The managed structure 102 is defined as a recipient and consumer of energy or natural resource supplied by the resource supplier 104. For example, the managed structure 102 can include a residence, a smart home or structure, a business, a manufacturing facility, a public gathering space, or a combination thereof.

The resource supplier 104 is defined as a producer or distributor of energy or natural resources. For example, the resource supplier 104 can be a power plant, a utility company, a refinery, or a gas station.

The resource supplier 104 can provide the managed structure 102 with energy or natural resources through the resource distribution network 106. The resource distribution network 106 is defined as a means for transporting, supplying, or availing the energy or natural resources to the managed structure 102.

For example, the resource distribution network 106 can include a power distribution network having a network of distribution lines, transformers, and transmission stations, or a network of connected gas pipes. Also, for example, the resource distribution network 106 can be a shipping or trucking service for delivering gasoline to local suppliers.

The resource supplier 104 and the managed structure 102 can also be connected through the communication network 108. The communication network 108 is defined as a means for communicating between the managed structure 102 and the resource supplier 104. For example, the communication network 108 can include telephone landlines, data lines, wireless communication networks, or a combination thereof.

The communication network 108 can also be connected to the emergency service 110. The emergency service 110 is defined as a private or government entity that provides services in response to emergencies. Emergencies can include situations related to health, disaster, security, law enforcement, or a combination thereof. For example, the emergency service 110 can include the hospitals, emergency response teams or services, fire stations and fire engines, the police, security service companies, and emergency reporting service and operators.

Figure 2:
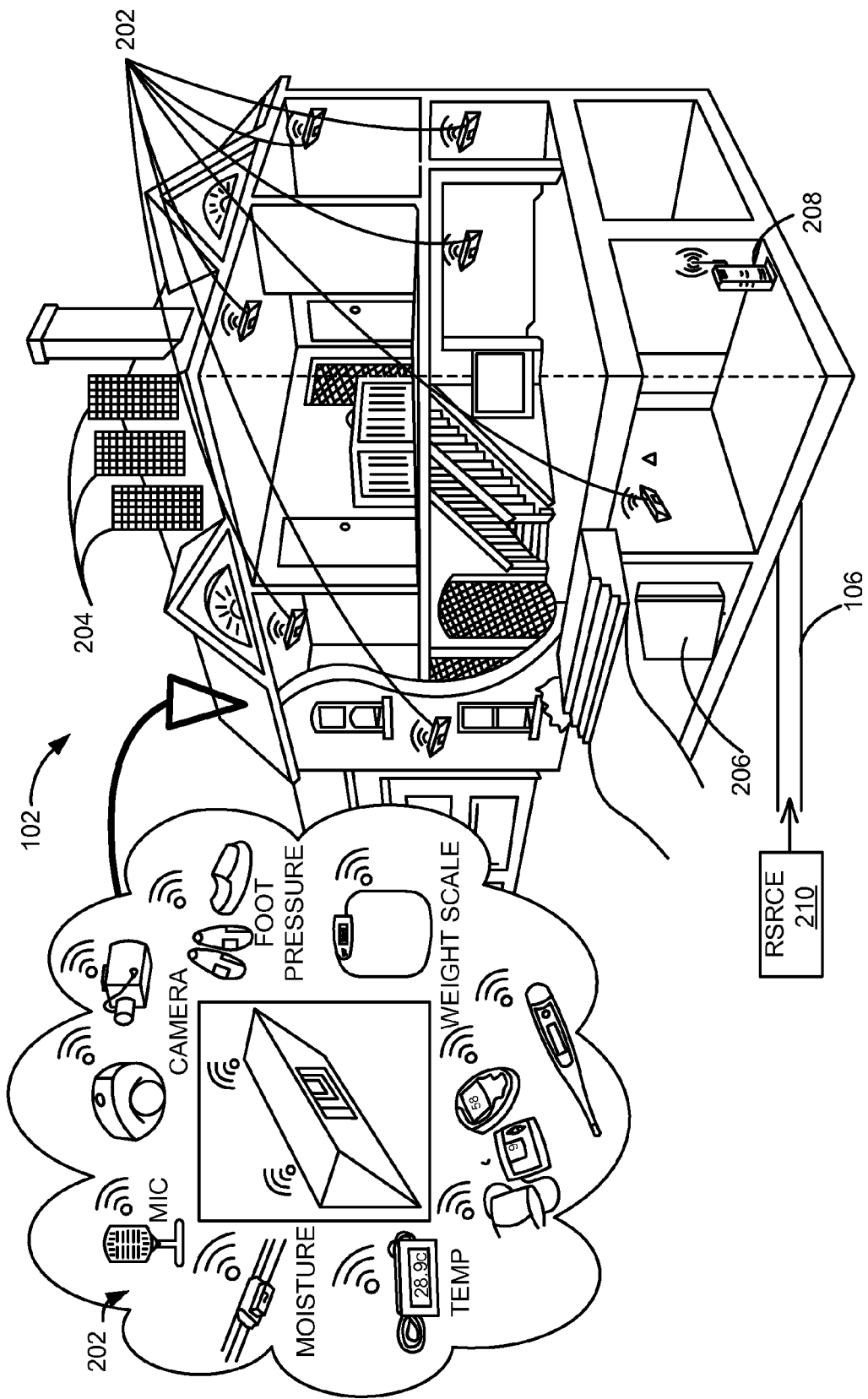
FIG. 2 is an exemplary diagram of the managed structure.

Referring now to FIG. 2, therein is shown an exemplary diagram of the managed structure 102. The managed structure 102 can have a sensor network 202, a solar panel 204, a resource-storage 206, and a central-manager 208. The sensor network 202, the solar panel 204, and the resource-storage 206 can all be connected to the central-manager 208. The central-manager 208 can be connected to the resource distribution network 106, the communication network 108 of FIG. 1, or both.

For illustrative purposes, the managed structure 102 will be described as having both the sensor network 202 and the central-manager 208. However, it is understood that the central-manager 208 can be outside of the managed structure 102. For example, the central-manager 208 can be at the resource supplier 104 of FIG. 1, the emergency service 110 of FIG. 1, or a separate service provider. Also, for example, a portion of the central-manager 208 can be at the managed structure 102 and the rest of the portions can be outside of the managed structure 102.

The sensor network 202 is defined as a series of sensors and device controllers, such as a camera or a light switch, capable of processing information at each of the sensors or within the network. The sensor network 202 can identify people or situations, activities, track movements, determine activity and behaviors from the movements, respond to behaviors by controlling devices or transmitting information, or a combination thereof.

The sensor network 202 can communicate with the central-manager 208, between the sensors therein, and between the sensors and device controllers. The sensor network 202 can have the sensors and the central-manager 208 connected through wires or wireless communication methods.

The sensor network 202 can detect, determine, observe, or a combination thereof the behavior of the people inside the managed structure 102. The sensor network 202 can determine and respond to common activities such as walking, cooking, watching television, as well as behaviors related to health or other dangerous situations, such as heart attacks, accidents, structural fire, or an intruder. The sensor network 202 can perform functions, such as detection and observation, without compromising the privacy of the occupants at each of the devices therein or within the overall network.

The sensor network 202 can send the detected, determined, or observed information to the central-manager 208, which can relay the information to the emergency service 110, or directly to the emergency service 110. The sensor network 202 can relay the information directly to the designated party. The sensor network 202 can communicate with the different devices or entities based on the movement and behavior detected or determined at the individual sensors within or at the network level.

The sensor network 202 can also have controllers, such as actuators or switching circuits, or be coupled to switches or device controls, such as light switches or oven control interface. The sensor network 202 can control individual devices, appliances, systems, or combinations thereof within the managed structure through the controls based on the movement and behavior detected or determined at the individual sensors within or at the network level. The details regarding the performance of the sensor network 202 will be described below.

The solar panel 204 is defined as a packaged assembly of photovoltaic cells that convert light energy into electricity. The solar panel 204 can supply electricity to the managed structure 102.

The resource-storage 206 is defined as a reservoir for holding energy or natural resource for use at a later time. For example, the resource-storage 206 can be an electrical battery or a tank for holding gasoline or natural gas, or a combination thereof. The contents of the resource-storage 206 can be used when the price for the energy or natural resource is high and can be recharged when the price is low.

The central-manager 208 is defined as a device for controlling the overall input and consumption of the energy or natural resource into the managed structure 102 and for processing the behavioral and usage data therein. The central-manager 208 can be a computing device that communicates with, controls, or both the sensor network 202, the solar panel 204, the resource-storage 206, heating or cooling system, main input lines, or a combination thereof.

The central-manager 208 can gather the information from all of the connections and send it to the sensor network 202. The central-manager 208 can receive and manage input from the sensor network 202. The central-manager 208 can provide the overall usage information to the sensor network 202, the external data for processing movements, behaviors, or both, or a combination thereof. The central-manager 208 can also process the data sensed within the sensor network 202.

The central-manager 208 can have a control mechanism for controlling overall operations of the managed structure 102. For example, the central-manager 208 can have a circuit for setting a thermostat for the central heating or cooling system, or a signal for enabling or disabling some portion of electricity or gas into the managed structure 102.

The central-manager 208 can also have control over the various devices or systems in the managed structure 102, similar to the sensor network 202 as described above. The central-manager 208 and the sensor network 202 can control different devices or systems from each other. For example, the sensor network 202 can control the light switches and televisions and the central-manager can control the heating and cooling systems or the main gas and water line.

Furthermore, the central-manager 208 and the sensor network 202 each can control the same device or system within the managed structure 102. For example, the sensor network 202 can control the light switches and appliances as one member moves throughout the managed structure 102 and the central-manager 208 can control the same switches and appliances when the member enters or leaves the managed structure 102. Also, for example, the sensor network 202, the central-manager 208, or both can sense the same emergency situation and access the communication network 108 to contact the emergency services 110.

The managed structure 102 can receive a resource 210 from the resource supplier 104. The resource 210 is defined as the energy or the natural resource received at the managed structure 102. For example, the resource 210 can be electricity, gas, oil, gasoline, water, or a combination thereof.

For illustrative purposes the sensor network 202 will be described as having the sensor network 202 connected to the solar panel 204, the resource-storage 206, the central-manager 208, and the control devices for controlling various devices and systems within the managed structure 102. However, it is understood that the sensor network 202 can be different, such as having the control devices for controlling the various devices within the sensor network 202.

Also, for illustrative purposes, the building management system 100 will be described as having the central-manager 208 separate from the sensor network 202. However, it is understood that the sensor network 202 can have the central-manager 208 integrated therein and have the functions of the central-manager 208 shared amongst different components within the sensor network 202.

The building management system 100 can gather data regarding the consumption of the resource 210 within the managed structure 102 using the sensor network 202, through the sensor network 202 and the central-manager 208. The building management system 100 can also control the consumption of the resource 210 within the managed structure 102 using the sensor network 202, through the connections to the various controllers mentioned above.

It has been discovered that the present invention provides the building management system 100 with improved conservation of the resource 210 and the cost for the managed structure 102. The sensor network 202 and the central-manager 208 gives rise to the improved conservation of the resource 210 and lower cost to the consumer by acquiring detailed information regarding the consumer usage and behavior for creating an accurate conservation plan by the building management system 100 and directly controlling the consumption to follow the conservation plan.

Figure 3:
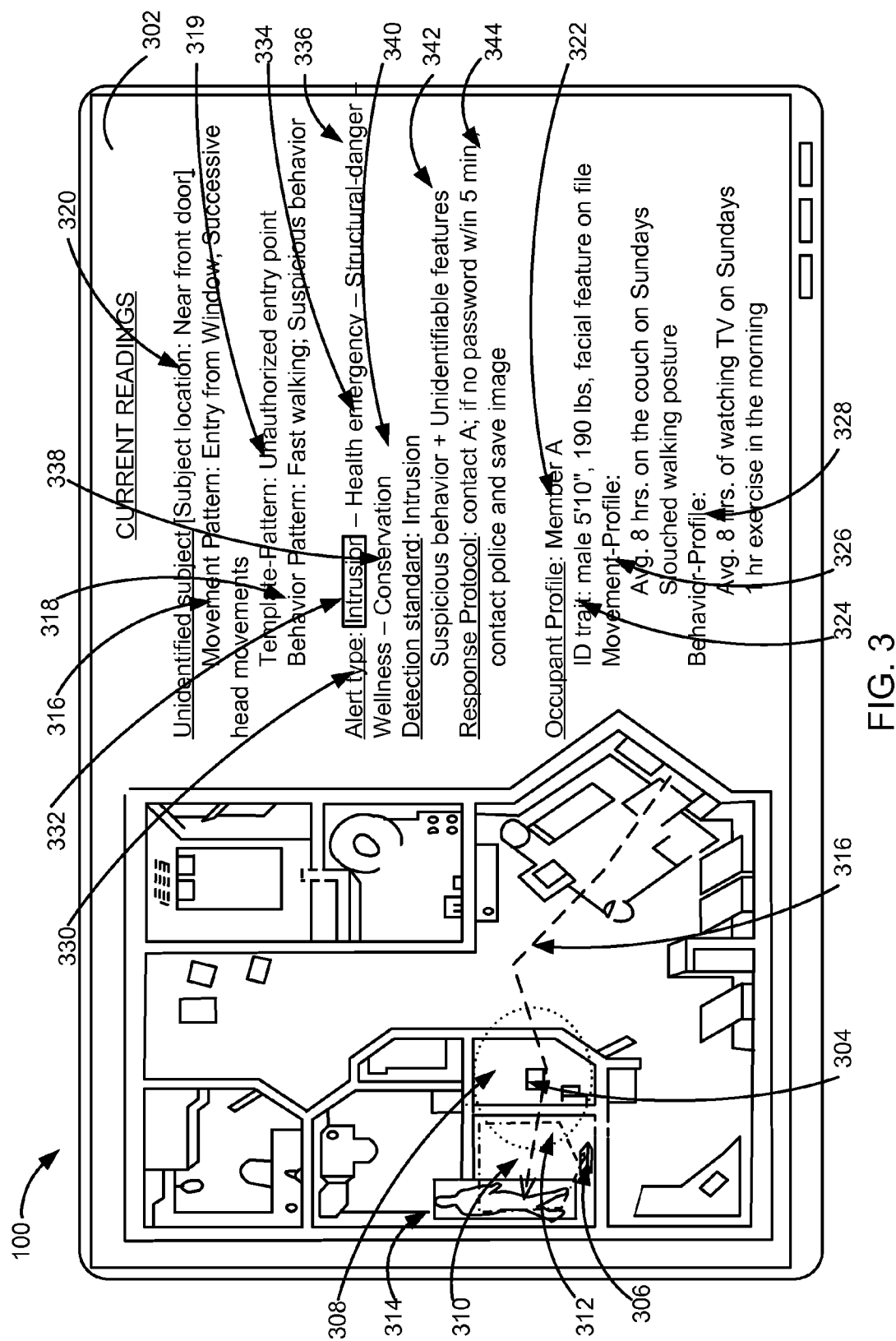
FIG. 3 is a first example of a display screen of the building management system.

Referring now to FIG. 3, therein is shown a first example of a display screen 302 of the building management system 100. The sensor network 202 of FIG. 2, the central-manager 208 of FIG. 2, or both can have the display screen 302 or be coupled to the display screen 302. For example, the display screen 302 can be the screens on the individual devices within the sensor network 202 or the television coupled to the central-manager 208.

The display screen 302 can show the sensor network 202 having a first sensor 304 and a second sensor 306. The first sensor 304 and the second sensor 306 are defined as devices that are used for identifying specific attributes of the surrounding environment. The first sensor 304 and the second sensor 306 can be a detection or depiction device, such as a camera, microphone, thermometer, scale, humidity or pressure sensor, or a combination thereof. Also, for example, the sensors can be a wearable health monitor, such as a blood pressure monitor or a glucose monitor.

The first sensor 304 and the second sensor 306 can process the sensed information at the sensor. For example, the first sensor 304 and the second sensor 306 can process the sensed information to distinguish between a member and a non-member, determine a situation or condition, or both.

The first sensor 304 and the second sensor 306 can also communicate with each other, with the central-manager 208, or both. For example, the first sensor 304 can identify someone as a member and send identification information to the second sensor 306, the central-manager 208, or both. Also, for example, the central-manager 208 can send information necessary to determine the situation or condition of a detected non-member to the second sensor 306, which can then be communicated to the first sensor 304 by the second sensor 306.

The first sensor 304 can have a first coverage area 308 and the second sensor can have a second coverage area 310. The first coverage area 308 is defined as the area in which the first sensor 304 can perform its functions. For example, the first coverage area 308 can be the viewing angle of the camera or the minimum or maximum detection decibel level or frequency for a microphone.

The first coverage area 308 can also be the area defined by features of the managed structure 102 of FIG. 1, such the walls or according to the floor plan. For example, the thermometer or the camera located within a room can have the first coverage area 308 defined by the walls of the room. Also, for example, the first coverage area 308 for pressure or weight sensor can be limited to the hallways or adjust the operations in areas under heavy loads, such as the areas under file cabinets or refrigerators.

The second coverage area 310 is defined as the area in which the second sensor 306 can perform its functions. The second coverage area 310 can be similar to the first coverage area 308 but for the second sensor 306 instead of the first sensor 304.

For illustrative purposes, the sensor network 202 will be described as having the first sensor 304 and the second sensor

306. However, it is understood that the sensor network 202 can have more sensors therein.

For example, the managed structure 102 requiring high security levels can have cameras to view all areas within the managed structure 102, and pressure sensors and microphones providing redundant coverage. Also, for example, the sensor network 202 can include multiple health monitoring devices, such as devices for monitoring heart rate, blood pressure, or body temperature, on a member.

For further illustrative purposes, the sensing devices within the sensor network 202 will be described as each having one sensing function. However, it is understood that the sensors can be different. For example, the first sensor 304 can be a smart camera capable of gathering visual and auditory information or a device for monitoring the moisture and the temperature.

The display screen 302 can also show the sensor network 202 having an overlapped area 312. The overlapped area 312 is defined as area in which more than one sensor can detect and process information. The overlapped area 312 can be an area where the first coverage area 308 and the second coverage area 310 overlap.

The display screen 302 can show a sensed attribute 314. The sensed attribute 314 is defined as data associated with the information currently sensed within the sensor network 202. For example, the sensed attribute 314 can be a captured image or a current video feed from a camera, the amount of weight and location of weight from a pressure sensor, temperature reading and estimated location of a temperature source from a thermometer or a thermal imager, recording and intensity of sound with estimated direction of a source relative to a stereo microphone, or a combination thereof.

The sensed attribute 314 can also include estimated information. The sensor network 202 can estimate physical information based on the sensed attribute 314. For example, the sensed attribute 314 can include estimates for height, weight, gender, or a combination thereof based on a camera image. Also, for example, the sensed attribute 314 can include a size estimate from a pressure sensor.

The display screen 302 can show a movement-pattern 316 and a behavior-pattern 318 of any person, member or non-member, within the managed structure 102. The movement-pattern 316 is defined as a sequence of locations relating to or of the person. The movement-pattern 316 can include the locations of the person within the managed structure 102. For example, the movement-pattern 316 can be a path the person took from a window to a front door within the managed structure 102.

The movement-pattern 316 can also include the locations of the person's features. For example, the movement-pattern 316 can be a characterization of the person waving an arm or the way a person walks.

The movement-pattern 316 can be described using locations and corresponding times for the locations. For example, the movement-pattern 316 can be described by a sequence of locations of the person periodically determined within the managed structure 102. Also, for example, the movement-pattern 316 can include movement of a body, such as eye or arm movement, or the posture of a body over a period of time.

The behavior-pattern 318 is defined as a recognized set of the movement-pattern 316 associated with a specific meaning. For example, the behavior-pattern 318 can include walking, running, kicking, seizure, or a combination thereof. Also, for example, the behavior-pattern 318 can include crouching or hunching, haste, suspicious behavior typical of an intruder, or a combination thereof.

The behavior-pattern 318 can be determined by comparing the movement-pattern 316 with a threshold speed, pattern, range or a combination thereof. For example, the building management system 100 can have a rate of movement or rate of head movement as a threshold for determining the behavior-pattern 318 indicating a suspicious behavior typical of an intruder. Also, for example, the behavior-pattern 318 can have posture shapes and ranges of postures for determining the behavior-pattern 318 recommended by physicians.

The display screen 302 can also show a template-pattern 319. The template-pattern 319 is defined as a recognized pattern that can be used to classify the information being sensed within the sensor network 202. The template-pattern 319 can be a predetermined pattern of movement, behavior, or both. The template-pattern 319 can be used to identify or classify the movement pattern 316 as one of the behavior-pattern 318.

For example, the template-pattern 319 can be a leg speed or step frequency to identify walking or running. The movement-pattern 316 can be compared with the template-pattern 319. When the movement-pattern 316 matches the template-pattern 319, movements sensed at a camera or a pressure sensor can be identified or classified as walking or running Also, for example, the template-pattern 319 can be a pattern of heat, light, smoke level, Carbon Monoxide level, or a combination thereof. The sensed attribute 314, the movement-pattern 316, or both can be compared to the template-pattern 319 to determine a fire.

The building management system 100 can gather information and identify the template-pattern 319. The building management system 100 can use the template-pattern 319 to identify, determine, continuously track, respond, or a combination thereof according to various situations or people within the managed structure 102. The details regarding the identification and the use of the template-pattern 319 will be discussed below.

The display screen 302 can further show a subject-location 320 or an occupant profile 322. The subject-location 320 is defined as the calculated location of any person, member or non-member, within the managed structure 102. For example, the subject-location 320 can be a location of a child within the managed structure 102, such as the northwest corner of the first room located on the second floor, west of the stair case and on the back side of the house. Also, for example, the subject-location 320 can be the location of an intruder, such as in the coat closet near the front door.

The occupant profile 322 is defined as a set of characteristics specific to a member associated with the managed structure 102. For example, the occupant profile 322 can be information regarding an employee or a family member.

The occupant profile 322 can have an identification trait 324, a movement-profile 326, a behavior-profile 328, or a combination thereof. The identification trait 324 is defined as one or more physical attributes that can be used to identify a member of the managed structure 102. For example, the identification trait 324 can include facial features, height, weight, voice signature, hair color, eye color, or a combination thereof. Also, for example, the identification trait 324 can include age and sex of the member.

The movement-profile 326 is defined as a plurality of the movement-pattern 316 of a specific member of the managed structure 102 during a time period. For example, the movement-profile 326 can include the walking or sitting posture of the specific member during the last 10 minutes. Also for example, the movement-profile 326 can include locations or average walking speed of the specific member during a day.

The behavior-profile 328 is defined as a set or sets of the behavior-pattern 318 of a specified member of the managed structure 102. For example, the behavior-profile 328 can include cutting and using kitchen appliances for cooking, opening a refrigerator, watching television, exercising, sleeping, or a combination thereof.

The behavior-profile 328 can also include the average duration, frequency within a time period, or a combination thereof for one or more of the behavior-pattern 318 for the specified member. For example, the behavior-profile 328 can include average the specified member opens the refrigerator between 5:00 pm to 9:00 pm, average duration a refrigerator remains open, or both. Also, for example, the behavior-profile 328 can include average time of day or frequency of repeated activities of the specified member within a house, such as eating, using the bathroom, sleeping, or a combination thereof.

The display screen 302 can also show an alert type 330. The alert type 330 is defined as a classification of situations that requires the building management system 100 to take specified actions.

For example, the alert type 330 can specify situations that require the building management system 100 to contact and inform one or more members of the managed structure 102, the emergency service 110 of FIG. 1, the resource supplier 104 of FIG. 1, or a combination thereof. Also, for example, the alert type 330 can require the building management system 100 to operate locking mechanisms, circuit breakers, gas valves, electrical devices or systems, or a combination thereof based on the recognized situations.

The display screen 302 can show examples of the alert type 330. The alert type 330 can include an intrusion alarm 332, a health-emergency alert 334, a structural-danger alert 336, a wellness notice 338, a conservation notice 340, or a combination thereof.

The intrusion alarm 332 is defined as a situation when a non-member, a person does not match all of the occupant profile 322 for the managed structure 102, enters the managed structure 102 without permission. For example, the intrusion alarm 332 can include when the non-member is in a store after business hours, when the non-member enters a home without being accompanied by a member, or when unauthorized personnel is detected in a classified area.

The building management system 100 can distinguish between situations appropriate for the alert type 330 and when a friend or emergency personnel enters the managed structure 102. The details regarding the recognition of the alert type 330 and the response to the alert type 330 will be discussed below.

The health-emergency alert 334 is defined as a situation when anyone within the managed structure 102, member or non-member, requires immediate medical attention. The health-emergency alert 334 can include situations that require the building management system 100 to immediately contact one or more members of the managed structure 102, the emergency service 110, or both. For example, the health-emergency alert 334 can include heart-attacks, strokes, seizures, physical assaults, or falls.

The structural-danger alert 336 is defined as a situation when a condition related to the managed structure 102 requires attention. For example, the structural-danger alert 336 can be a fire within or of the managed structure 102 or water on the floor.

The wellness notice 338 is defined as a situation when a suggestion or an action is appropriate to improve the overall health of a member. For example, the wellness notice 338 can be a notice on the television to take a break and walk around when the member has been watching television without physical activity for more than a predetermined duration. Also, for example, the wellness notice 338 can be a requirement for the member to physically move or exercise to keep the building management system 100 from turning the television off.

The conservation notice 340 is defined as a situation when a suggestion or an action is appropriate to improve the consumption of the resource 210 of FIG. 2 by a particular member. For example, the conservation notice 340 can be a desired maximum number of times for the particular member to open the refrigeration or a maximum desired duration for a refrigerator remains open. Also, the conservation notice 340 can be when the particular member leave their office, appropriate for turning the lights off in the office or turning the lights on in the corridor.

Each of the alert type 330 can have a detection standard 342. The detection standard 342 is defined as a predetermined pattern or sequence of information sensed by the sensor network 202 that triggers each of the alert type 330. The detection standard 342 can be specific value, pattern, range or a combination thereof of the movement-pattern 316, the behavior-pattern 318, the occupant profile 322, or a combination thereof. The detection standard 342 can also be sensed structural information, such as excessive heat or pool of water.

For example, the intrusion alarm 332 can be when the sensor network 202 detects anyone within the managed structure 102 having features not identified in the occupant profile 322, having a predefined value of the movement-pattern 316, such as entering through a window or carrying a weapon, having a predefined value of the behavior-pattern 318, such as haste or specific head movements, or any combination thereof. Also, for example, the structural-danger alert 336 can be when the sensor network 202 senses temperatures exceeding 120 degrees Fahrenheit, Carbon-Monoxide levels exceeding 10 parts-per-million, or both.

Each of the alert type 330 can also have a response protocol 344. The response protocol 344 is defined as actions the building management system 100 is to take for corresponding alert type. For example, the response protocol 344 for the intrusion alarm 332 can be to call member A, if no specified response, such as a code or password, is received within 5 minutes, store the sensed attribute 314 and contact the emergency service 110. Also, for example, the response protocol 344 for the wellness notice 338 can be to give a notice, such as through speakers or any displays, or to regulate devices or systems, such as turning a television off.

The building management system 100 can have the sensor network 202, the individual devices within the sensor network 202, the central-manager 208, or a combination thereof perform the necessary operations for the elements described above. The details regarding the operations, such as determining or calculating, as well as the interaction between the various devices, will be described below.

Figure 4:
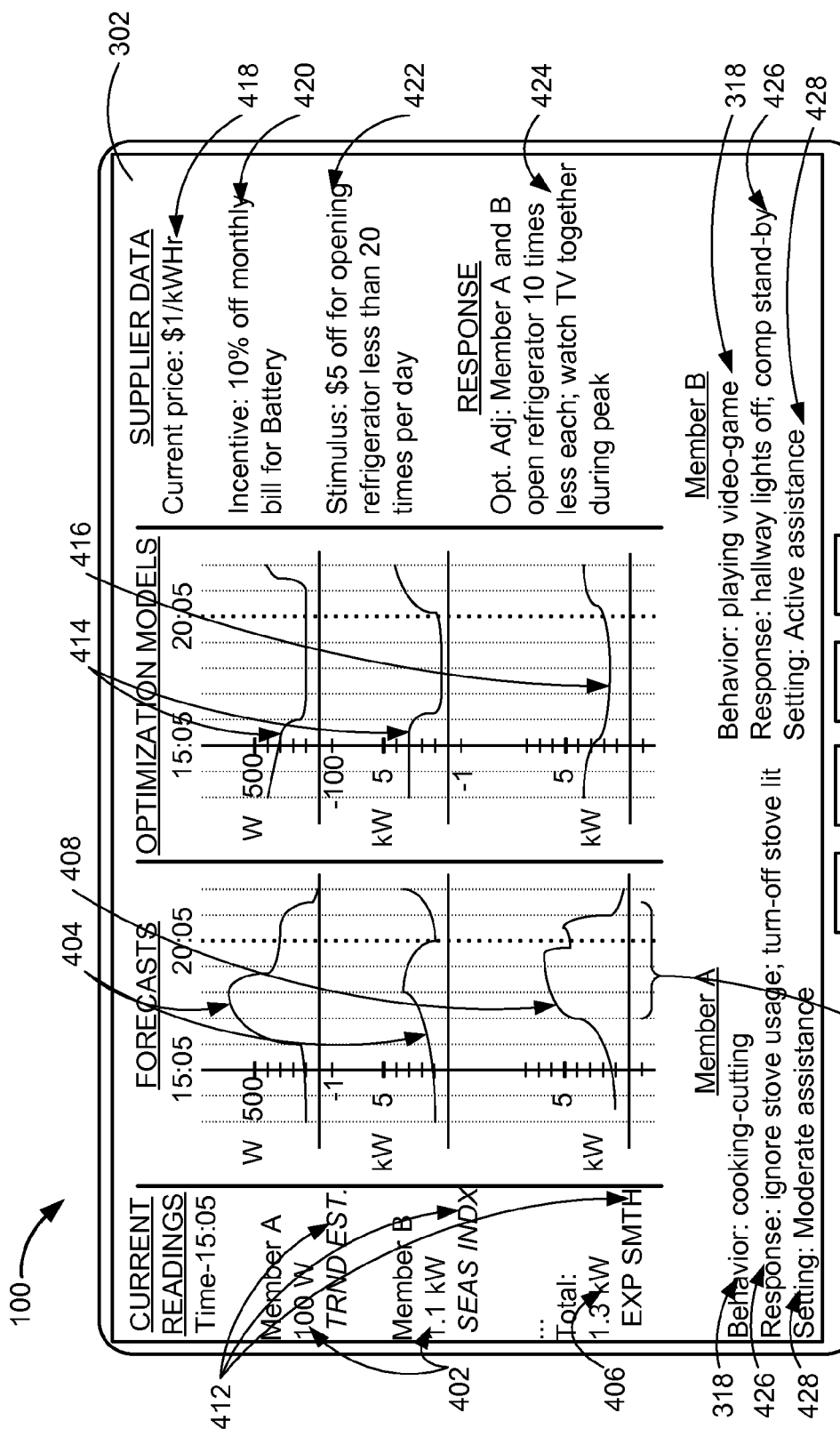
FIG. 4 is a second example of the display screen of the building management system.

Referring now to FIG. 4, therein is shown a second example of the display screen 302 of the building management system 100. The display screen 302 can show a member-usage status 402, a member-usage forecast 404, a total-usage status 406, and a total-usage forecast 408.

The member-usage status 402 is defined as the current usage or consumption of the resource 210 of FIG. 2 by a specific member of the managed structure 102 of FIG. 1. The member-usage status 402 can be the rate of usage based on time. For example, the member-usage status 402 can indicate the wattage of the electricity currently being used by the specific member or the current British thermal unit (BTU) of gas used by the specific member.

The member-usage forecast 404 is defined as the predicted usage or consumption of the resource 210 by a specified member of the managed structure 102. The member-usage forecast 404 can be the predicted rate of usage determined for a future time based on past usage, user profile, seasonal usage models, status of the sensor network 202 of FIG. 2, weather forecast, or any combination thereof. For example, the member-usage forecast 404 can be represented by a graph of predicted gas usage levels over time of the specified member or an averaged usage of water for the specified member for a period of time.

The building management system 100 can determine and use the member-usage forecast 404 in a variety of ways. The details regarding the determination and the application of the member-usage forecast 404 will be discussed below.

The total-usage status 406 is defined as the current total of the resource 210 demanded from the resource supplier 104 of FIG. 1 or used by the managed structure 102. The total-usage status 406 can be the sum of the member-usage status 402 for all members of the managed structure 102.

The total-usage forecast 408 is defined as the predicted amount of the resource that will be demanded from the resource supplier 104. The total-usage forecast 408 can be the sum of the member-usage forecast 404 for all members of the managed structure 102 being served or supplied by the resource supplier 104.

The building management system 100 can determine and use the total-usage forecast 408 in a variety of ways. The details regarding the determination and the application of the total-usage forecast 408 will be discussed below.

The total-usage forecast 408 can have a peak-period 410. The peak-period 410 is defined as the period of time surrounding the time at which the usage amount is the highest. For example, the peak-period 410 can be from 5:00 pm to 7:00 pm, where electricity usage is at the highest point within a day. Also, the peak-period 410 can be surrounding a popular vacation period when most people travel, such as during the summer months or family oriented holidays, when gasoline consumption is the highest within a year.

The member-usage forecast 404 and the total-usage forecast 408 can be determined using a forecast model 412. The forecast model 412 is defined as a method for forecasting and determining the future usage of the resource 210. For example, the forecast model 412 can be Delphi, market research, historical method, last period demand, moving average, exponential smoothing, multiplicative seasonal indexes, linear prediction, trend estimation, or any combination of methods or processes thereof.

The display screen 302 can also show a member-optimization model 414, a total-optimization model 416, and an assessment structure 418. The member-optimization model 414 is defined as a usage plan for each member of the managed structure 102 that best optimize the resource 210 and the cost for the managed structure 102.

For example, the member-optimization model 414 can be an electricity usage method, outlined as watts over time that would yield the lowest monthly bill for the family. Also, for example, the member-optimization model 414 can be speed or acceleration profile for a vehicle that yields the highest miles-per-gallon for a unit of gasoline.

The building management system 100 can calculate and use the member-optimization model 414 in a variety of ways. The details regarding the calculation and the application of the member-optimization model 414 will be discussed below.

The total-optimization model 416 is defined as an overall usage method for the managed structure 102 that best optimizes the resource 210. The building management system 100 can calculate and use the total-optimization model 416 in a variety of ways. The details regarding the calculation and the application of the total-optimization model 416 will be discussed below.

The assessment structure 418 is defined as an evaluation of the value of the resource 210 that can be used within the managed structure 102. For example, the assessment structure 418 can be a rate sheet used by a utility company for billing purposes. Also, for example, the assessment structure 418 can be based on a point or quota system for an amount of the resource 210 being consumed.

The display screen 302 can also show an incentive 420 and a behavioral stimulus 422. The incentive 420 is defined as discounts or price breaks, such as 10% off of the monthly bill or one time $100 deduction, for meeting certain conditions. For example, the incentive 420 can be price breaks given for agreeing to allow the resource supplier 104 to control the thermostat settings, when the consumer installs batteries or solar panels, upgrading the sensor network 202, or any combination thereof. The incentive 420 can be received from the resource supplier 104.

The behavioral stimulus 422 is defined as a benefit, such as a discount in price or a gift, given to the consumer for changing specific behavior-patterns. The resource supplier 104 can send the behavioral stimulus 422 to help optimize the usage of the resource 210. The building management system 100 can use the behavioral stimulus 422 to tailor specific methods for each member to optimize the usage of the resource 210.

For example, the behavioral stimulus 422 can be a reduction in price if a consumer opens the fridge door for less than 10 seconds each time, less than a specified number of times in a day, or both. Also, for example, the behavioral stimulus 422 can be a gift sent to a consumer if they reduce television operation time by 20%.

The display screen 302 can also show a system response 424, a member-specific response 426, and an assistance setting 428. The system response 424 is defined as a goal for the managed structure 102 overall for optimizing the usage of the resource 210. The system response 424 can use or respond to the assessment structure 418, the incentive 420, the behavioral stimulus 422, the total-usage status 406, the total-usage forecast 408, the behavior-pattern 318, the occupant profile 322 of FIG. 3, or a combination thereof.

For example, the system response 424 can be for all members in a family to open the refrigerator less than 20 times each day, less than 10 times per member in a two-member family, to take advantage of the behavioral stimulus 422. Also, for example, the system response 424 can be for the building management system 100 to shut off a water faucet when any member is brushing their teeth.

The member-specific response 426 is defined as a goal or an action for a member in changing their behavior for optimizing the usage of the resource. For example, the member-specific response 426 can be a 5% reduction in total consumption of the resource 210 for the member. Also, for example, the member-specific response 426 can be a notification when the member walks away from running water faucets.

The assistance setting 428 is defined as a selection regarding the level or amount of assistance the building management system 100 is to provide a particular member. The assistance setting 428 can be a function of distance, time, activity, or a combination thereof.

For example, the assistance setting 428 can be set to 5 feet, where the building management system 100 regards devices or controls further than 5 feet away from the particular member as not being used by the particular member. The building management system 100 can let the particular member control devices and controllers within 5 feet and turn-off or set the devices to a power-conserving mode.

Also, for example, the assistance setting 428 can be set to a more passive setting between 5:00 pm and 7:00 pm in the kitchen or for when the particular member is cooking. The assistance setting 428 can set the interaction level and the different types of actions for the building management system 100.

The building management system 100 can have the sensor network 202, the individual devices within the sensor network 202, the central-manager 208 of FIG. 2, or a combination thereof perform the necessary operations for the elements described above. The details regarding the operations, such as determining or calculating, as well as the interaction between the various devices, will be described below.

Figure 5:
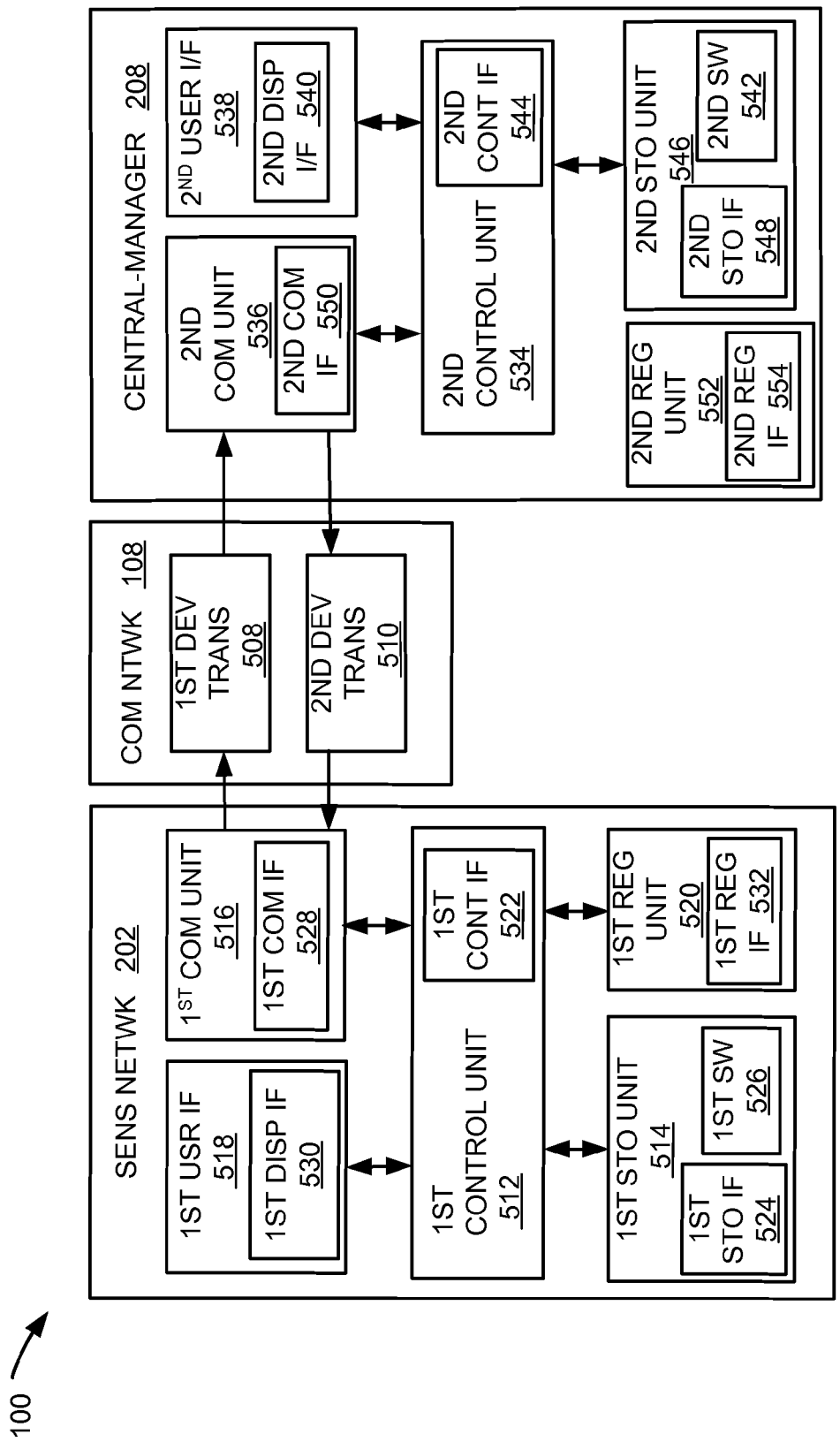
FIG. 5 is an exemplary block diagram of building management system.

Referring now to FIG. 5, therein is shown an exemplary block diagram of the building management system 100. The building management system 100 can include the sensor network 202, the central-manager 208, and the communication network 108. The sensor network 202 can communicate with anything within the communication network 108, including the central-manager 208.

For illustrative purposes, the building management system 100 will be described as having the sensor network 202 interacting with the central-manager 208 through the communication network 108. However, it is understood that communication between devices and systems can be different.

For example, individual devices within the sensor network 202, such as the first sensor 304 of FIG. 3 and the second sensor 306 of FIG. 3, can communicate with each other directly or through the central-manager 208, directly with the central-manager 208, with other entities or devices outside of the managed structure 102 of FIG. 1, or a combination thereof through the communication network 108. Also, for example, the central-manager 208 can also communicate with individual devices within the sensor network 202 or with other entities or devices outside of the managed structure 102 through the internet.

The sensor network 202 can send information in a first device transmission 508 over the communication network 108 to the central-manager 208. The central-manager 208 can send information in a second device transmission 510 over the communication network 108 to the sensor network 202.

For illustrative purposes, the building management system 100 is shown with the sensor network 202 as a client device, although it is understood that the building management system 100 can have the sensor network 202 as a different type of device. For example, the sensor network 202 can also operate as a server.

Also for illustrative purposes, the building management system 100 is shown with the central-manager 208 as a server, although it is understood that the building management system 100 can have the central-manager 208 as a different type of device. For example, the central-manager 208 can be a client device.

For further illustrative purposes, the sensor network 202 will be shown as one entity having various units, such as a network of various sensors in a cloud computing or self-configuring type of setting. However, it is understood that the sensor network 202 can be shown differently. For example, the first sensor 304, the second sensor 306, or both can be shown having one or all of the various units below.

Also, for example, the first sensor 304 and the second sensor 306 can be shown coupled to each other to make up the sensor network 202. Further yet, for example, the first sensor 304, the second sensor 306, or both can be shown coupled to the central-manager 208.

The sensor network 202 can include a first control unit 512, a first storage unit 514, a first communication unit 516, a first user interface 518, and a first regulator unit 520. The sensor network 202 can be similarly described by the sensor network 202. The first control unit 512 can include a first control interface 522. The first storage unit 514 can include a first storage interface 524.

The first control unit 512 can execute a first software 526 to provide the intelligence of the building management system 100. The first control unit 512 can operate the first user interface 518 to display information generated by the building management system 100. The first control unit 512 can also execute the first software 526 for the other functions of the building management system 100, including receiving location information from the first regulator unit 520. The first control unit 512 can further execute the first software 526 for interaction with the communication network 108 via the first communication unit 516.

The first control unit 512 can be implemented in a number of different manners. For example, the first control unit 512 can be a processor, an embedded processor, a microprocessor, a hardware control logic, a hardware finite state machine, a digital signal processor, or a combination thereof.

The first control unit 512 can include the first control interface 522. The first control interface 522 can be used for communication between the first control unit 512 and other functional units in the sensor network 202. The first control interface 522 can also be used for communication that is external to the sensor network 202.

The first control interface 522 can receive information from the other functional units or from external sources, or can transmit information to the other functional units or to external destinations. The external sources and the external destinations refer to sources and destinations external to the sensor network 202.

The first control interface 522 can be implemented in different ways and can include different implementations depending on which functional units or external units are being interfaced with the first control interface 522. For example, the first control interface 522 can be implemented with a pressure sensor, an inertial sensor, a microelectromechanical system, optical circuitry, waveguides, wireless circuitry, wireline circuitry, or a combination thereof.

The first storage unit 514 can store the first software 526. The first storage unit 514 can also store the relevant information, such as phone numbers, identification information, user profiles, predetermined goals, resource cost forecasts, user inputs and configurations, or any combination thereof.

The first storage unit 514 can be a volatile memory, a nonvolatile memory, an internal memory, an external memory, or a combination thereof. For example, the first storage unit 514 can be a nonvolatile storage such as nonvolatile random access memory, Flash memory, disk storage, or a volatile storage such as static random access memory.

The first storage unit 514 can include the first storage interface 524. The first storage interface 524 can be used for communication between the first regulator unit 520 and other functional units in the sensor network 202. The first storage interface 524 can also be used for communication that is external to the sensor network 202.

The first storage interface 524 can receive information from the other functional units or from external sources, or can transmit information to the other functional units or to external destinations. The external sources and the external destinations refer to sources and destinations external to the sensor network 202.

The first storage interface 524 can include different implementations depending on which functional units or external units are being interfaced with the first storage unit 514. The first storage interface 524 can be implemented with technologies and techniques similar to the implementation of the first control interface 522.

The first communication unit 516 can enable external communication to and from the sensor network 202 and amongst the devices within the sensor network 202. For example, the first communication unit 516 can permit the sensor network 202 to communicate with the central-manager 208, an attachment, such as a peripheral device or a computer desktop.

The first communication unit 516 can also function as a communication hub allowing the sensor network 202 to function as part of the communication network 108 and not limited to be an end point or terminal unit to the communication network 108. The first communication unit 516 can include active and passive components, such as microelectronics or an antenna, for interaction with the communication network 108.

The first communication unit 516 can include a first communication interface 528. The first communication interface 528 can be used for communication between the first communication unit 516 and other functional units in the sensor network 202. The first communication interface 528 can receive information from the other functional units or can transmit information to the other functional units.

The first communication interface 528 can include different implementations depending on which functional units are being interfaced with the first communication unit 516. The first communication interface 528 can be implemented with technologies and techniques similar to the implementation of the first control interface 522.

The first user interface 518 allows a user to interface and interact with the sensor network 202. The first user interface 518 can include an input device and an output device. Examples of the input device of the first user interface 518 can include a keypad, a touchpad, soft-keys, a keyboard, a microphone, or any combination thereof to provide data and communication inputs.

The first user interface 518 can include a first display interface 530. Examples of the output device of the first user interface 518 can include the first display interface 530. The first display interface 530 can include a display, a projector, a video screen, a speaker, or any combination thereof.

The first regulator unit 520 can control other devices that use or control the resource 210 of FIG. 2, such as the water faucet or the lights, or store the resource 210, as examples. The first regulator unit 520 can be implemented in many ways. For example, the first regulator unit 520 can be a central switching unit that can connect or disconnect the power to the wall power outlets or a signal driver to control the light switches. Also, for example, the first regulator unit 520 can be a digital driver coupled to the solar panel 204 of FIG. 2 for controlling the allocation of the generated power.

The first regulator unit 520 can include a first regulator interface 532. The first regulator interface 532 can be used for communication between the first regulator unit 520 and other functional units in the sensor network 202. The first regulator interface 532 can also be used for communication that is external to the sensor network 202.

The first regulator interface 532 can receive information from the other functional units or from external sources, or can transmit information to the other functional units or to external destinations. The external sources and the external destinations refer to sources and destinations external to the sensor network 202.

The first regulator interface 532 can include different implementations depending on which functional units or external units are being interfaced with the first regulator unit 520. The first regulator interface 532 can be implemented with technologies and techniques similar to the implementation of the first control unit 512.

For illustrative purposes, the sensor network 202 is shown with the partition having the first control unit 512, the first storage unit 514, the first user interface 518, the first communication unit 516, and the first regulator unit 520 although it is understood that the building management system 100 can have a different partition. For example, the first software 526 can be partitioned differently such that some or all of its function can be in the first control unit 512, the first regulator unit 520, and the first communication unit 516. Also, the sensor network 202 can include other functional units not shown in FIG. 5 for clarity.

The functional units in the sensor network 202 can work individually and independently of the other functional units. The sensor network 202 can work individually and independently from the central-manager 208 and the communication network 108.

The central-manager 208 can be optimized for implementing the present invention in a multiple device embodiment with the sensor network 202. The central-manager 208 can provide the additional or higher performance processing power compared to the sensor network 202. The central-manager 208 can include a second control unit 534, a second communication unit 536, and a second user interface 538.

The second user interface 538 allows a user to interface and interact with the central-manager 208. The second user interface 538 can include an input device and an output device. Examples of the input device of the second user interface 538 can include a keypad, a touchpad, soft-keys, a keyboard, a microphone, or any combination thereof to provide data and communication inputs. Examples of the output device of the second user interface 538 can include a second display interface 540. The second display interface 540 can include a display, a television, a projector, a video screen, a speaker, or any combination thereof.

The second control unit 534 can execute a second software 542 to provide the intelligence of the central-manager 208 of the building management system 100. The second software 542 can operate in conjunction with the first software 526. The second control unit 534 can provide additional performance compared to the first control unit 512.

The second control unit 534 can operate the second user interface 538 to display information. The second control unit 534 can also execute the second software 542 for the other functions of the building management system 100, including operating the second communication unit 536 to communicate with the sensor network 202 over the communication network 108.

The second control unit 534 can be implemented in a number of different manners. For example, the second control unit 534 can be a processor, an embedded processor, a microprocessor, a hardware control logic, a hardware finite state machine, a digital signal processor, or a combination thereof.

The second control unit 534 can include a second controller interface 544. The second controller interface 544 can be used for communication between the second control unit 534 and other functional units in the central-manager 208. The second controller interface 544 can also be used for communication that is external to the central-manager 208.

The second controller interface 544 can receive information from the other functional units or from external sources, or can transmit information to the other functional units or to external destinations. The external sources and the external destinations refer to sources and destinations external to the central-manager 208.

The second controller interface 544 can be implemented in different ways and can include different implementations depending on which functional units or external units are being interfaced with the second controller interface 544. For example, the second controller interface 544 can be implemented with a pressure sensor, an inertial sensor, a microelectromechanical system, optical circuitry, waveguides, wireless circuitry, wireline circuitry, or a combination thereof.

A second storage unit 546 can store the second software 542. The second storage unit 546 can also store the relevant information, such as phone numbers, identification information, user profiles, predetermined goals, user inputs and configurations, or any combination thereof. The second storage unit 546 can be sized to provide the additional storage capacity to supplement the first storage unit 514.

For illustrative purposes, the second storage unit 546 is shown as a single element, although it is understood that the second storage unit 546 can be a distribution of storage elements. Also for illustrative purposes, the building management system 100 is shown with the second storage unit 546 as a single hierarchy storage system, although it is understood that the building management system 100 can have the second storage unit 546 in a different configuration. For example, the second storage unit 546 can be formed with different storage technologies forming a memory hierarchal system including different levels of caching, main memory, rotating media, or off-line storage.

The second storage unit 546 can be a volatile memory, a nonvolatile memory, an internal memory, an external memory, or a combination thereof. For example, the second storage unit 546 can be a nonvolatile storage such as non-volatile random access memory, Flash memory, disk storage, or a volatile storage such as static random access memory.

The second storage unit 546 can include a second storage interface 548. The second storage interface 548 can be used for communication between the first regulator unit 520 and other functional units in the central-manager 208. The second storage interface 548 can also be used for communication that is external to the central-manager 208.

The second storage interface 548 can receive information from the other functional units or from external sources, or can transmit information to the other functional units or to external destinations. The external sources and the external destinations refer to sources and destinations external to the central-manager 208.

The second storage interface 548 can include different implementations depending on which functional units or external units are being interfaced with the second storage unit 546. The second storage interface 548 can be implemented with technologies and techniques similar to the implementation of the second controller interface 544.

The second communication unit 536 can enable external communication to and from the central-manager 208. For example, the second communication unit 536 can permit the central-manager 208 to communicate with the sensor network 202, external devices or systems, or both over the communication network 108.

The second communication unit 536 can also function as a communication hub allowing the central-manager 208 to function as part of the communication network 108 and not limited to be an end point or terminal unit to the communication network 108. The second communication unit 536 can include active and passive components, such as microelectronics or an antenna, for interaction with the communication network 108.

The second communication unit 536 can include a second communication interface 550. The second communication interface 550 can be used for communication between the second communication unit 536 and other functional units in the central-manager 208. The second communication interface 550 can receive information from the other functional units or can transmit information to the other functional units.

The second communication interface 550 can include different implementations depending on which functional units are being interfaced with the second communication unit 536. The second communication interface 550 can be implemented with technologies and techniques similar to the implementation of the second controller interface 544.

The first communication unit 516 can couple with the communication network 108 to send information to the central-manager 208 in the first device transmission 508. The central-manager 208 can receive information in the second communication unit 536 from the first device transmission 508 of the communication network 108.

The second communication unit 536 can couple with the communication network 108 to send information to the sensor network 202 in the second device transmission 510. The sensor network 202 can receive information in the first communication unit 516 from the second device transmission 510 of the communication network 108. The building management system 100 can be executed by the first control unit 512, the second control unit 534, or a combination thereof.

The central-manager 208 can have a second regulator unit 552. The second regulator unit 552 can control other devices that use or control the resource 210, such as the water faucet or the lights, or store the resource 210, as examples. The second regulator unit 552 can be implemented in many ways. For example, the second regulator unit 552 can be a central switching unit that can connect or disconnect the power to the wall power outlets or a signal driver to control the light switches. Also, for example, the second regulator unit 552 can be a digital driver coupled to the solar panel 204 for controlling the allocation of the generated power.

The second regulator unit 552 can also be connected to the resource distribution network 106. For example, the second regulator unit 552 can be connected to the gas line coming into the house, the electrical wires at different points within the factory, gas tanks, or a combination thereof. The second regulator unit 552 can control the amount of the resource 210 transferring between each of the managed structure 102 and the resource supplier 104 at the managed structure 102.

The second regulator unit 552 can include a second regulator interface 554. The second regulator interface 554 can be used for communication between the second regulator unit 552 and other functional units in the central-manager 208. The second regulator interface 554 can also be used for communication that is external to the central-manager 208.

The second regulator interface 554 can receive information from the other functional units or from external sources, or can transmit information to the other functional units or to external destinations. The external sources and the external destinations refer to sources and destinations external to the central-manager 208.

The second regulator interface 554 can include different implementations depending on which functional units or external units are being interfaced with the second regulator unit 552. The second regulator interface 554 can be implemented with technologies and techniques similar to the implementation of the first control unit 512.

For illustrative purposes, the central-manager 208 is shown with the partition having the second user interface 538, the second storage unit 546, the second control unit 534, and the second communication unit 536, although it is understood that the central-manager 208 can have a different partition. For example, the second software 542 can be partitioned differently such that some or all of its function can be in the second control unit 534 and the second communication unit 536. Also, the central-manager 208 can include other functional units not shown in FIG. 5 for clarity.

The functional units in the central-manager 208 can work individually and independently of the other functional units. The central-manager 208 can work individually and independently from the sensor network 202 and the communication network 108.

For illustrative purposes, the building management system 100 is described by operation of the sensor network 202 and the central-manager 208. It is understood that the sensor network 202 and the central-manager 208 can operate any of the modules and functions of the building management system 100. For example, the sensor network 202 is described to operate the first regulator unit 520, although it is understood that the central-manager 208 can also operate the first regulator unit 520.

For further illustrative purposes, the building management system 100 is described as having the sensor network 202 interacting with the central-manager 208 through the communication network 108. It is understood that the sensor network 202, having identical or similar components as the central-manager 208 can interact with the sensor network 202.

For example, the sensor network 202 can have the second communication unit 536 therein to communicate with the central-manager 208. Also, for example, the sensor network 202 can have the second control unit 534, the second storage unit 546, and the second user interface 538 for carrying on the same functions as the central-manager 208.

It has been discovered that the present invention provides the building management system 100 with improved conservation of the resource 210. The combination of the assessment structure 418 of FIG. 4, the forecasts 404 of FIGS. 4 and 408 of FIG. 4, the optimization models 414 of FIGS. 4 and 416 of FIG. 4, the sensor network 202 having control over the devices or appliances, and the central-manager 208 having overall control over the managed structure 102 gives rise to the improved conservation by directly controlling the individual and overall usage to mimic the optimization models 414 and 416.

The sensor network 202 can use the first user interface 518, the first regulator unit 520, the first control unit 512, or a combination thereof and control the consumption of individual members to closely follow the member-optimization model 414. The central-manager 208 can use the second user interface 538, the second regulator unit 552, the second control unit 534, or a combination thereof and control the overall consumption of the resource 210 at the managed structure 102 to closely follow the total-optimization model 416.

Figure 6:
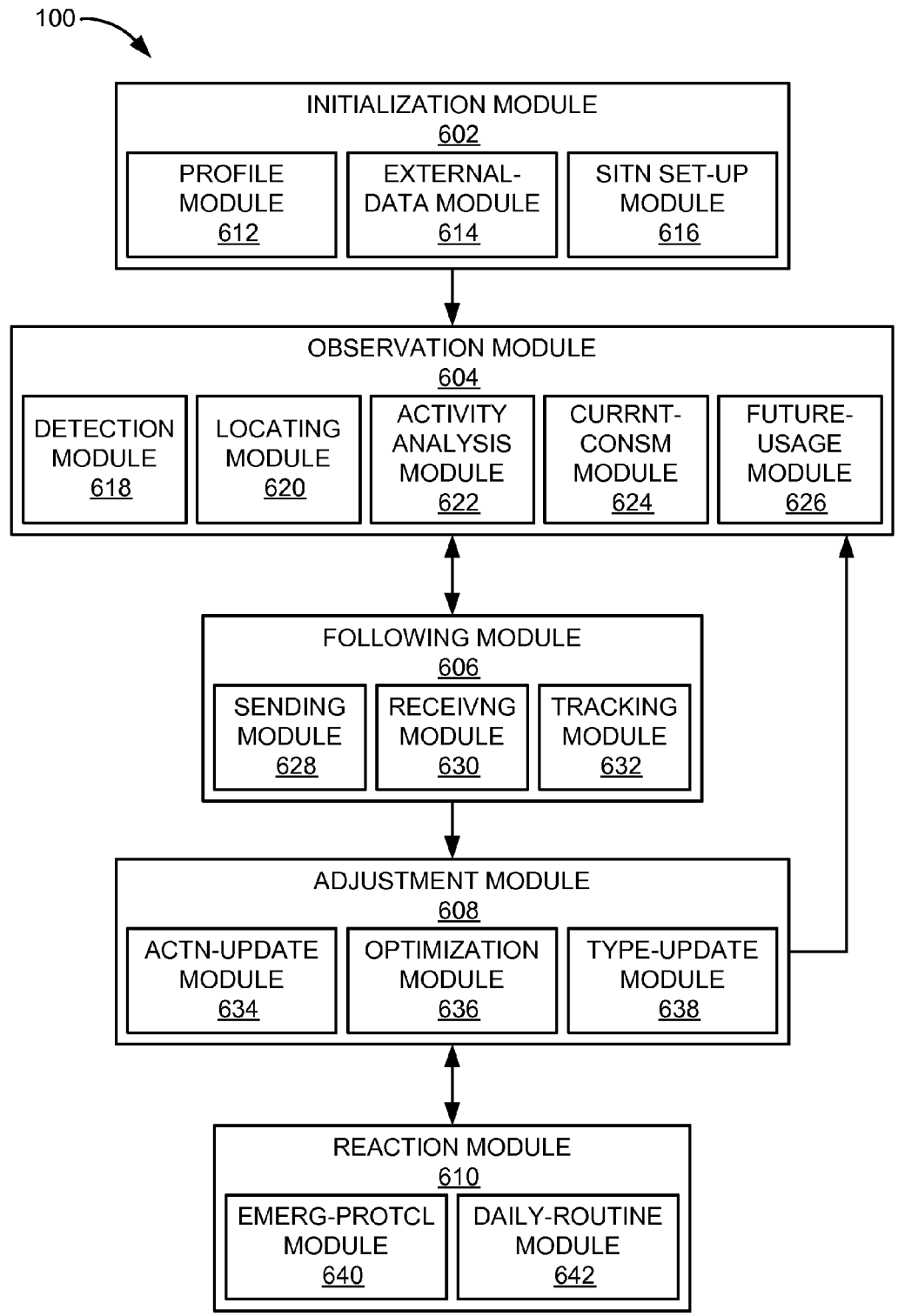
FIG. 6 is a control flow of the building management system.

Referring now to FIG. 6, therein is shown a control flow of the building management system 100. The building management system 100 can have an initialization module 602, an observation module 604, a following module 606, an adjustment module 608, and a reaction module 610.

The initialization module 602 can be coupled to the observation module 604, which can be coupled to the following module 606. The following module 606 can be coupled to the adjustment module 608, which can be coupled to the reaction module 610 and the observation module 604.

The initialization module 602 is for initially setting up the building management system 100 to recognize and assist members of the managed structure 102 of FIG. 1. The initialization module 602 can initially set up to recognize the members and situations by detecting the coverage areas within the sensor network 202 of FIG. 2, establishing the occupant profile 322 of FIG. 3, gathering the necessary information, and by establishing the alert type 330 of FIG. 3.

The initialization module 602 can determine the first coverage area 308 of FIG. 3 for the first sensor 304 of FIG. 3 or the second coverage area 310 of FIG. 3 for the second sensor 306 of FIG. 3, or both. The initialization module 602 can determine the first coverage area 308 or the second coverage area 310 by requesting the range information from the first sensor 304 or the second sensor 306.

The initialization module 602 can receive the range or granularity information from the sensors or receive the model numbers from the sensors and match the model numbers to specifications found on the internet or stored in the initialization module 602. The initialization module 602 can set the maximum range or a fraction of the maximum range associated with each sensor as the coverage area.

For example, if the first sensor 304 is a floor pressure sensor that can detect pressure to 90% accuracy with a 7 foot radius surrounding the first sensor 304, the initialization module 602 can determine the 7 foot radius circle around the first sensor 304 as the first coverage area 308. Also, for example, if the second sensor 306 is a camera having pixel count and processing ability to recognize faces up to 10 feet away, the initialization module 602 can determine open areas within 10 feet from the second sensor 306 and within a viewing angle as the second coverage area 310.

The initialization module 602 can also use a known object, signal, reference point, data metric, or a combination thereof to calibrate the sensor network 202 and simultaneously determine the coverage areas. For example, the camera can obtain a model number of a wall mount television from a sensed image or by direct communication with the television. The camera can obtain dimensions of the television from the building management system 100, the internet, the television, the user, or a combination thereof.

The camera can calibrate the perceived size against the specification of the television. The initialization module 602 can establish the wall as being the boundary of the coverage area when the perceived size is within a threshold range of the actual dimensions of the television. The building management system 100 can establish the threshold range by using the granularity of the sensor, user preference, pre-loaded data tables, or any combination thereof.

The initialization module 602 can also establish, adjust, or both the coverage areas through user input. For example, a homeowner may interact with the sensors to limit a sensing range. Also, for example, the building security officer may train and initialize the sensor to calculate sensing boundaries, such as walls or rooms.

After establishing the coverage areas, the initialization module 602 can analyze the inanimate or structural objects within the coverage areas. For example, the initialization module 602 can analyze an image seen from a camera to decipher walls, columns, desks, cabinets, large appliances, switches, outlets, or other generally static objects. The initialization module 602 can use image recognition techniques, such as edge matching or invariance method.

Also, for example, the initialization module 602 can analyze the weight location and amount sensed by a pressure sensor during off-hours in a factory to identify static objects. The initialization module 602 can sense the heavier objects that stay in the same location over time or where no changes are ever sensed to analyze the inanimate or structural objects.

The initialization module 602 can adjust the coverage areas to account for the inanimate or static objects. Also, the initialization module 602 can use the established objects as reference points.

The initialization module 602 can set up the network portion of the sensor network 202. The initialization module 602 can follow predetermined networking protocols, such as peripheral component interconnect (PCI) or zero configuration networking (zeroconf), to recognize all of the sensors. For example, the first sensor 304 and the second sensor 306 can recognize, communicate, and establish a communication routine with each other. The first sensor 304 and the second sensor 306 can repeat the process until no new sensor is found.

Also, for example, the central-manager 208 of FIG. 2 can follow similar process with each of the sensors. The central-manager 208 can establish the sensor network 202 using all of the sensors and communicate the networking information to each sensor.

The initialization module 602 can physically locate each of the sensors within the sensor network 202. The initialization module 602 can locate the sensors relative to other sensors or with reference to the managed structure 102.

The initialization module 602 can locate the sensors relative to each other using a variety of methods. For example, the initialization module 602 can analyze reference points or objects within the first coverage area 308 and the second coverage area 310. When common reference points are found, such as stairs or refrigerators, the initialization module 602 can locate physical positions of the first sensor 304 and the second sensor 306.

The initialization module 602 can also locate sensors relative to each other and calibrate the relative locations of the sensors during daily activity. For example, the first sensor 304 and the second sensor 306 can detect common movement, such as doors opening at the same time and rate or a movement being simultaneously detected at both sensors.

The initialization module 602 can locate the sensors with reference to the managed structure 102. The initialization module 602 can get the floor plan or the diagram of the managed structure 102. The initialization module 602 can search the internet or public databases for the floor plan or the diagram, or use user input to establish the floor plan or diagram of the managed structure 102.

The initialization module 602 can locate a known structural boundary or reference point of the managed structure 102, such as the front entrance or a fireplace from the floor plan. The initialization module 602 can search the sensed attribute 314 of FIG. 3 of each of the sensors in the sensor network 202 to find the known structural boundary or reference point. The initialization module 602 can repeat the process for all known points and combine the information with the relative locations of the sensors to locate the sensors with reference to the managed structure 102.

The locations of the sensors within the sensor network 202 can be part of the floor plan. The initialization module 602 can identify the sensors in the floor plan and match the corresponding sensor feedback to the location in the floor plan. Also, the locations of the sensors can be loaded into the building management system 100 during installation process through the initialization module 602.

The initialization module 602 can locate the coverage areas with respect to each corresponding sensors with respect to the managed structure 102. The initialization module 602 can find where the coverage areas overlap to determine the overlapped area 312 of FIG. 3.

The overall mapping of the sensors and the coverage areas with respect to the managed structure 102 can be stored in the first storage unit 514 of FIG. 5, the second storage unit 546 of FIG. 5 or both. The individual sensors can each have the overall mapping information or only the information regarding the adjacent sensors and coverage areas.

The initialization module 602 can use the first control unit 512 of FIG. 5, the second control unit 534 of FIG. 5 to process the data in mapping the sensor network 202. Also, the initialization module 602 can use the first communication unit 516 of FIG. 5, the second communication unit 536 of FIG. 5, or both to communicate within the sensor network 202, between the sensors and the central-manager 208, or with any external sources. The initialization module 602 can use the first user interface 518 of FIG. 5, the second user interface 538 of FIG. 5, or both to communicate with the user and to gather the sensed attribute 314.

The initialization module 602 can have a profile module 612, an external-data module 614, and a situation set-up module 616. The profile module 612 is for establishing the profiles for each member associated with the managed structure 102. The profile module 612 can establish the occupant profile 322, including the assistance setting 428 of FIG. 4, the movement-profile 326 of FIG. 3, the behavior-profile 328 of FIG. 3, the identification trait 324 of FIG. 3, or a combination thereof.

The profile module 612 can establish the occupant profile 322 by accessing a database having the information regarding each of the members. For example, the profile module 612 can access an employee data base or a survey for the household, such as census or voter registration.

The profile module 612 can establish the occupant profile 322 for each of the members found to be associated with the managed structure 102. The profile module 612 can establish the occupant profile 322 by designating certain portions of the profile module 612, certain devices or circuits, blocks of memory, data structures or classes, or a combination thereof to correspond to each of the members.

The profile module 612 can find information related to each of the members. The profile module 612 can get the information from various data bases, user input, surveys, or a combination thereof. For example, the profile module 612 can also acquire age, sex, office or cubical location, identification number or picture, or a combination thereof from an employee database. Also, for example, the profile module 612 can get birthdate, age, sex, height, weight, and picture of each of the members from a vehicle licensing authority.

The profile module 612 can establish the identification trait 324 of each of the members as the physically detectable and distinguishable attributes of the members. For example, the profile module 612 can establish the identification trait 324 as facial features or points for facial recognition, height, weight, posture, sex, silhouette of the body, hair color, eye color, or a combination thereof of each member.

The profile module 612 can also establish the assistance setting 428. The profile module 612 can establish the assistance setting 428 based on age. For example, the assistance setting 428 for children under 12 years old and elderly over 65 years old can be set to have the building management system 100 offer higher level of assistance. Also, for example, the assistance setting 428 can be set to a special setting for the members age 10 to 16 to account for growth spurts in assisting with wellness related aspects.

The profile module 612 can also establish the movement-profile 326 and the behavior-profile 328. The profile module 612 can establish the movement-profile 326 and the behavior-profile 328 by reserving certain portions of the occupant profile 322, such as certain devices or circuits, blocks of memory, data structures or classes, or a combination thereof for storing and adjusting the movement-profile 326 and the behavior-profile 328.

The profile module 612 can also establish the movement-profile 326 and the behavior-profile 328 by searching the internet or a database to find the movement-pattern 316 of FIG. 3 and the behavior-pattern 318 of FIG. 3 typical of people similar to the member. For example, the profile module 612 can search medical database to find the typical walking pattern of a 12 year-old male member. Also, for example, the profile module 612 can search the internet for behavior-patterns, such as using the bathroom or daily health checks, for a member living with diabetes.

The profile module 612 can store and update such patterns of movements and behaviors into the movement-profile 326 and the behavior-profile 328. The building management system 100 can use and adjust the established profiles. The details of the use and adjustments will be described below.

The profile module 612 can also establish the occupant profile 322 by going through initialization procedures. For example, the profile module 612 can query each family member moving into a house or a new-hire for a company through the first user interface 518 or the second user interface 538. The profile module 612 can gather the necessary information through the queries for the identification trait 324, the assistance setting 428, the movement-profile 326, the behavior-profile 328, or a combination thereof.

The profile module 612 can process the gathered data with the first control unit 512, the second control unit 534, or both to establish the occupant profile 322. The profile module 612 can store the occupant profile 322 in the first storage unit 514, the second storage unit 546, or both.

The initialization module 602 can also gather data related to the identity of members through the external-data module 614. The external-data module 614 is for searching and gathering external information necessary for the building management system 100. The external-data module 614 can receive the assessment structure 418 of FIG. 4, the incentive of FIG. 4, the behavioral stimulus of FIG. 4, the total-optimization model 416 of FIG. 4, or a combination thereof.

The external-data module 614 can receive information from the resource supplier 104 of FIG. 1. The external-data module 614 can query or respond to queries from the resource supplier 104 based on established protocols or schedules to receive the assessment structure 418. The external-data module 614 can be coupled to the resource supplier 104 through the communication network 108 of FIG. 1, and use the first communication unit 516, the second communication unit 536, or both to communicate with the resource supplier 104.

The external-data module 614 can also other related information. For example, the external-data module 614 can gather average growth or aging patterns of people of similar age, height, weight, health condition, same sex, or a combination thereof as compared to each of the members. The external-data module 614 can also gather information regarding the typical usage pattern of the resource 210 for the people that are similar to each of the members.

The external-data module 614 can have a database of relevant data and gather the related data from such database. The software manufacturer, the hardware manufacturer, the service provider, the health service provider, the user, or a combination thereof can establish and update the database. The external-data module 614 can also search the internet for the relevant data.

The external-data module 614 can also use similar methods to determine initial values for the template-pattern 319. For example, the external-data module 614 can find a threshold leg speed or a range of step frequency for identifying running or walking from various medical or health related databases. Also, for example, the external-data module 614 can prompt a domain expert such as a security expert or officer or the user to input various movement patterns that would be considered suspicious.

The initialization module 602 can use the relevant data gathered by the external-data module 614 to establish the various aspects of the alert type 330. The situation set-up module 616 is for establishing the various aspects of the alert type 330.

The situation set-up module 616 can establish the various aspects of the alert type 330 by searching the internet or connected databases for specific categories of situations. The situation set-up module 616 can be preconfigured by the software manufacturer, the hardware manufacturer, the user, the service provider, the emergency service 110 of FIG. 1, the resource supplier 104, or a combination thereof to have categories.

The categories or different values for the alert type 330 can be the intrusion alarm 332 of FIG. 3, the health-emergency alert 334 of FIG. 3, the structural-danger alert 336 of FIG. 3, the wellness notice 338 of FIG. 3, the conservation notice 340 of FIG. 3, or a combination thereof. The situation set-up module 616 can establish each of the alert type 330 by establishing the detection standard 342 of FIG. 3 and the response protocol 344 of FIG. 3 for each type.

The situation set-up module 616 can establish the detection standard 342 using the information from the external-data module 614, user input, input from the emergency service 110 or the resource supplier 104, or a combination thereof. For example, the situation set-up module 616 can use exhibitions of dangerous symptoms related to a health condition of a member or various falling patterns of elderly people gathered by the external-data module 614 as the detection standard 342 for the health-emergency alert 334.

The user can be passive or be required to approve the standards or the norms. The user can also define specifics of the detection standard 342. For example, a parent of a family can establish the detection standard 342 as when an adolescent member of the family leaves a room leaving a light on for the conservation notice 340 to account for specific habits or behaviors.

The situation set-up module 616 can use information received from the emergency service 110 or the resource supplier 104 to establish the detection standard 342. For example, the situation set-up module 616 can use a nationally recommended Carbon Monoxide level from a local fire station or government agency as the detection standard 342 of the structural-danger alert 336 for detecting house fires.

Also, for example, the situation set-up module 616 can use the total-optimization model 416 from the resource supplier 104 to establish the conservation notice 340. The situation set-up module 616 can equally or proportionately divide the consumption amounts in the total-optimization model 416 by the total number of members initially. The divided amount can be the detection standard 342 for the conservation notice 340.

The situation set-up module 616 can establish the response protocol 344 using similar methods as for establishing the detection standard 342. For example, the situation set-up module 616 can use information from the external-data module 614, user input, input from the emergency service 110 or the resource supplier 104, or a combination thereof to determine a set of responses for the building management system 100. Responses can include, notifying one or all of the members, sounding an alarm, contacting the emergency service 110, storing or sending the subject-location 320 of FIG. 3 or the sensed attribute 314, controlling specified devices or system, such as the cooling system or an electrical outlet, or a combination thereof.

The situation set-up module 616 can use the first control unit 512, the second control unit 534, or both to process the data and establish the alert type 330. The situation set-up module 616 can use the first control interface 522 of FIG. 5, the second controller interface 544 of FIG. 5, the first communication unit 516, the second communication unit 536, or a combination thereof to access the necessary data. The situation set-up module 616 can store the alert type 330 and the associated information in the first storage unit 514, the second storage unit, or both.

The observation module 604 is for observing the managed structure 102 and analyzing the observed information. The observation module 604 can have a detection module 618, a locating module 620, an activity analysis module 622, a current-consumption module 624, and a future-usage module 626.

The detection module 618 is for observing the managed structure 102. The detection module 618 can observe the managed structure 102 by identifying the movement-pattern 316 within the sensor network 202, such as at the first sensor 304 or the second sensor 306.

The detection module 618 can identifying the movement-pattern 316 at the first sensor 304 or the second sensor 306 for comparing against the alert type 330. The detection module 618 can have a baseline data, such as a still image of a room having no movement or any people or a weight distribution of the stationary objects in an office. The detection module 618 can compare the current data being sensed at the first sensor 304 or the second sensor 306 against the baseline data at the sensors.

The detection module 618 can also use methods for organizing and recognizing the data, such as edge detection or Fourier Transform and frequency analysis, and compare the data over a time period. For example, the detection module 618 can compare data each sampling cycle or every 30 seconds for differences in the sensed data. The detection module 618 can identify the differences from the baseline data, between the samples of the sensed attribute 314, or a combination thereof as the movement-pattern 316.

The detection module 618 can use facial or feature recognition algorithms, such as the linear discriminate analysis or the differential method, to identify the cause of the movement-pattern 316. For example, the detection module 618 can compare the sensed attribute 314 to various shapes to identify whether an object or a person is moving. Also, for example, the detection module 618 can compare facial or bodily features of the sensed attribute 314 from a camera with the identification trait 324 to identify whether a stranger or a member, and which member is moving.

The detection module 618 can also use similar methods to recognize situations or objects associated with the person. For example, the detection module 618 can identify weapons, badges, uniforms, or a combination thereof in light of the alert type 330.

Also, for example, the detection module 618 can initially identify strangers near, greeted or accompanied by, coming through an acceptable entrance point, or a combination thereof as a friend or guest. The detection module 618 can initially identify strangers having certain recognized values of the movement-pattern 316, causing other recognized values of the movement-pattern 316 in the member, carrying a weapon, entering through a non-typical entry point, or a combination thereof as a threat.

The detection module 618 can use the first user interface 518, the second user interface 538, the first communication unit 516, the second communication unit 536, various interfaces, or a combination thereof to access the sensed attribute 314. The detection module 618 can use the first control unit 512, the second control unit 534, or both to process and compare the data to identify the movement-pattern 316 and the cause thereof.

The detection module 618 can associate the movement-pattern 316 corresponding to the identified person, member or non-member, or the object. The movement-pattern 316 can be used to compare with the alert type 330, which will be discussed below. The movement-pattern 316 can also be used to locate the identified person or object.

The locating module 620 is for locating the person or object corresponding to the movement-pattern 316. The locating module 620 can locate the source of the movement-pattern 316 by calculating the subject-location 320 using the movement-pattern 316, the occupant profile 322, recognized data regarding shapes and movement-patterns, or a combination thereof.

The locating module 620 can calculate the subject-location 320 by analyzing the movement-pattern 316. For example, the locating module 620 can identify a human-like figure moving an arm. The locating module 620 can compare the movement, change in size and shape of the sensed attribute 314 through the movement, and common reference points or shapes to calculate the subject-location 320. Also, for example, the locating module 620 can calculate the subject-location 320 using changes in signal strength of wearable sensors corresponding to the movement-pattern 316.

The locating module 620 can calculate the subject-location 320 by comparing the proportionality of the sensed attribute 314 with the identification trait 324. For example, the locating module 620 can determine location based on size of the sensed attribute 314 of a member and the known height of the member. Also, for example, the locating module 620 can calculate direction and distance of a noise source using time delay and intensity levels perceived by a stereo microphone.

The locating module 620 can also use recognized data, such as 3-dimensional modeling, average attributes of applicable people or objects, physical attributes of a known non-member to identify the subject-location 320. The locating module 620 can use the information gathered by the external-data module 614 or gather relevant information in using similar methods as the external-data module 614. The locating module 620 can also use information predetermined by the software manufacturer, the hardware manufacturer, the service provider, the user, or a combination thereof.

Along with the location of the source, the movement-pattern 316 can be observed and analyzed further to recognize behaviors. The activity analysis module 622 is for determining the behavior-pattern 318 using the movement-pattern 316 within the sensor network 202. For example, the activity analysis module 622 can determine the behavior-pattern 318 using the movement-pattern 316 at the first sensor 304 or at the second sensor 306.

The activity analysis module 622 can determine the behavior-pattern 318 by analyzing the movement-pattern 316 using pattern recognition algorithms. For example, the activity analysis module 622 can use methods such as hierarchical clustering, Bayesian networks, condition random fields, ensemble averaging, or a combination thereof.

The activity analysis module 622 can also determine the behavior-pattern 318 by comparing the movement-pattern 316 to the template-pattern 319. For example, the activity analysis module 622 can acquire the template-pattern 319 for common weight transfer pattern or related frequencies of various people walking or running. Also, for example, the activity analysis module 622 can compare the template-pattern 319 for leg or arm movement of the sensed attribute 314 to movement-patterns typical of striking.

The activity analysis module 622 can compare the movement-pattern 316 with the template-pattern 319 gathered by the external-data module 614. The activity analysis module 622 can gather the template-pattern 319 using similar methods as the external-data module 614. The activity analysis module 622 can determine the behavior-pattern 318 by setting the name or the type associated with the template-pattern 319 as the value for the behavior-pattern 318 associated with the movement-pattern 316.

The activity analysis module 622 can also use the movement-profile 326, the behavior-profile 328, or both to determine the behavior-pattern 318. The activity analysis module 622 can find patterns similar to the movement-pattern 316 in the movement-profile 326. The activity analysis module 622 can set the behavior-pattern 318 to the value of the behavior-profile 328 corresponding to the pattern similar to the movement-pattern 316.

The activity analysis module 622 can have thresholds and algorithms for finding similarities between movements. The activity analysis module 622 can have predetermined values or criteria for timing, frequency, sequence, location, trajectory, speed, or a combination thereof. The values or criteria can be predetermined by the building management system 100, the software manufacturer, the hardware manufacturer, the service provider, the user, or a combination thereof.

The activity analysis module 622 can use the first control unit 512, the second control unit 534, or both to determine the behavior-pattern 318. The activity analysis module 622 can access the predetermined thresholds or algorithms, the first software 526 of FIG. 5, the second software 542 of FIG. 5, or a combination thereof through the first control interface 522 of FIG. 5, the second controller interface 544 of FIG. 5, the first storage interface 524 of FIG. 5, the second storage interface 548 of FIG. 5, or a combination thereof.

It has been discovered that the present invention provides the building management system 100 with detailed observations while maintaining privacy. The activity analysis module 622 and the movement-pattern 316, external data, the occupant profile 322, or a combination thereof to determine the behavior-pattern 318 give rise to the detailed observations while maintaining privacy by analyzing the behavior at the sensor network 202 without transmitting the sensed attribute 314 outside of the network.

For illustrative purposes the detection module 618, the locating module 620, and the activity analysis module 622 has been described as being within the sensor network 202, such as being in the first sensor 304 or the second sensor 306. However, it is understood that the modules can be partitioned differently. For example, the modules can be shared with the central-manager 208. The central-manager 208 can have the software and algorithm portions that the individual sensors access to process the sensed attribute at the sensors.

The observation module 604 can also monitor and observe the consumption of the resource 210. The current-consumption module 624 is for identifying the current consumption of the resource 210. The current-consumption module 624 can identify the member-usage status 402 of FIG. 4, total-usage status 406 of FIG. 4, or both.

The current-consumption module 624 can identify the member-usage status 402 by measuring the amount of usage. The current-consumption module 624 can be coupled to the devices that measure the amount of the resource 210 entering or being used in the managed structure 102, such as the electric meter or the gas tank meter. The current-consumption module 624 can receive readings and feedbacks regarding the amount of use from the measuring devices at the managed structure 102.

The current-consumption module 624 can use the first communication unit 516, the second communication unit 536 or both to communicate with the measuring devices or components. The sensor network 202 can use the first control unit 512, the second control unit 534, or both to read the measurement from a measurement device. The sensor network 202 can also have measurement capability through the first user interface 518, the second user interface 538, or both, or through the first regulator unit 520 of FIG. 5, the second regulator unit 552, or both.

The current-consumption module 624 can also identify the member-usage status 402 by calculating the amount of usage. The current-consumption module 624 can identify the behavior-pattern 318 associated with consuming the resource 210, such as turning on the oven or using the iron.

The current-consumption module 624 can measure the length of time the resource 210 is consumed by measuring the duration between the behavior-pattern 318 marking the start of the consumption and the behavior-pattern 318 marking the end of the consumption. The current-consumption module 624 can multiply the duration by the rate of consumption.

The current-consumption module 624 can calculate the usage rate from ascertaining the levels of the activity, such as the stove temperature or the iron setting. The current-consumption module 624 can also use the average rate of consumption typical for the activity or the device. The average rate can be gathered through the external-data module 614 or using methods similar to the external-data module 614. The current-consumption module 624 can also calculate the usage rate using the sensed attribute 314, such as the change in temperature or humidity caused by the behavior-pattern 318 at the sensor.

The current-consumption module 624 can also identify the total-usage status 406 of the resource 210 currently supplied by the resource supplier 104 to the managed structure 102. The current-consumption module 624 can identify the total-usage status 406 by summing all of the member-usage status 402 for all members within the managed structure 102.

The current-consumption module 624 can also identify the total-usage status 406 using methods similar to identifying the member-usage status 402, as described above, at the level of the managed structure 102. For example, the current-consumption module 624 can measure total intake of the resource 210 using the second regulator interface 554 of FIG. 5 or calculate the total of the consumption based on all of the behaviors within the managed structure 102 using the first control unit 512, the second control unit 534, or both.

The building management system 100 can receive the member-usage forecast 404, the total-usage forecast 408 of FIG. 4, or both from an external source as described above. The building management system 100 can also calculate the various forecasts using the member-usage status 402.

The future-usage module 626 is for calculating the member-usage forecast 404, the total-usage forecast 408, or both using the forecast model 412 of FIG. 4. The future-usage module 626 can determine the member-usage forecast 404 by determining the forecast model 412.

The future-usage module 626 can determine the forecast model 412 by comparing the outputs of the various models to the member-usage status 402. The future-usage module 626 can determine the forecast model 412 by selecting and using the method that is closest to the member-usage status 402. The future-usage module 626 can similarly select and use the method that is the closest to the member-usage status 402 over a period of time.

The future-usage module 626 can also determine the forecast model 412 following predetermined methods or steps. For example, the future-usage module 626 can use specific methods during certain periods of a year, for certain types of consumers, for certain patterns of usage, for certain usage levels, or any combination thereof.

The future-usage module 626 can determine the member-usage forecast 404 by using the forecast model 412 and the past records of the member-usage forecast 404 or the member-usage status 402, the weather forecast, season, user profile, or any combination thereof. The future-usage module 626 can also use the behavior-pattern 318 tied to the usage of the resource 210.

For example, the future-usage module 626 can receive the number of times a refrigerator door is opened during a time period and the duration the door stays open each time. Also, for example, the future-usage module 626 can differentiate between an unoccupied structure and when occupants are sleeping.

The future-usage module 626 can calculate the total-usage forecast 408 using methods similar to calculating the total-usage status 406. For example, the future-usage module 626 can use the measuring, estimating, calculating method, or a combination thereof, similar to the current-consumption module 624 to calculate the total-usage forecast 408.

The future-usage module 626 can also use the various optimization models that are fed back to the future-usage module 626 to calculate the member-usage forecast 404, the total-usage forecast 408, or both. The future-usage module 626 can assess the likelihood and the adherence level of the members to the optimization models to calculate the forecasts.

It has been discovered that the present invention provides the building management system 100 with improved conservation of the resource 210. The combination of the member-usage forecast 404, the future-usage module 626, the occupant profile 322, the movement-pattern 316, and the behavior-pattern 318 gives rise to the improved conservation by allowing detailed observation of the usage of the resource 210 and allowing control over the consumption contemporaneous to the consuming behavior.

The observation module 604 can pass the calculated, determined, and established results, such as the movement-pattern 316 or the behavior-pattern 318 to the following module 606. The following module 606 is for continually observing people and activities within the sensor network 202. The following module 606 can have a sending module 628, a receiving module 630, and a tracking module 632 for continually observing the people and activities.

The sending module 628 is for sending the activity or behavior information between the devices within the sensor network 202. For example, the sending module 628 can transmit the sensed attribute 314, the movement-pattern 316, the behavior-pattern 318, or a combination thereof from the first sensor 304 to the second sensor 306 or from the second sensor 306 to the first sensor 304.

The sending module 628 can broadcast the information to all sensors within the sensor network 202. The sending module 628 can also determine the appropriate sensor to send the information. The sending module 628 can use sensed attribute 314, the movement-pattern 316, the movement-profile 326, the behavior-pattern 318, the behavior-profile 328, the location of the adjacent sensor or the coverage area as located using methods described above, the overlapped area 312, or a combination thereof to determine the appropriate sensor.

For example, if the movement-pattern 316 indicates a detected figure is moving to the right of the first sensor 304, the sending module 628 can send necessary data to the second sensor 306 having the overlapped area 312 to the right of the first sensor 304. Also, for example, if the behavior-pattern 318 indicates that a detected figure is running, the sending module 628 can send necessary information to a series of sensors having coverage areas in line with the direction of the run.

The receiving module 630 is for receiving the identification, activity, or behavior information sent between the devices within the sensor network 202. For example, the receiving module 630 can receive the movement-pattern 316, the behavior-pattern 318, or both sent from the first sensor 304 to the second sensor 306 or from the second sensor 306 to the first sensor 304.

The receiving module 630 can receive and record all information sent by any sensor within the sensor network 202. The receiving module 630 can receive and record the information sent by an adjacent sensor or a select group of sensors near the receiving sensor. The receiving module 630 can use methods complementary to that of the sending module 628.

The sending module 628 and the receiving module 630 can use the first communication unit 516 or the first communication interface 528 of FIG. 5 to send and receive the data. The sending module 628 can also use the second communication unit 536, the second communication interface 550 of FIG. 5, or both, using the central-manager 208 as a hub between the devices within the sensor network 202.

The building management system 100 can use the sending and receiving of the sensed information to track any person, objects, movements, activities, or a combination thereof within the managed structure 102. The tracking module 632 is for processing the communicated data to track a continuing movement or behavior. The tracking module can track the movement-pattern 316, the behavior-pattern 318, or both at the first sensor 304, the second sensor 306, or both after the sensed attribute 314, the movement-pattern 316, the behavior-pattern 318, the occupant profile 322, or a combination thereof has been sent from one and received by the other.

The tracking module 632 can track the movements or behaviors by associating the sensed attribute 314 at the receiving sensor with the movement-pattern 316 or the behavior-pattern 318 sent by the previous sensor. For example, when a non-member moves from the first coverage area 308 to the second coverage area 310, the tracking module 632 can track the location of the non-member. The tracking module 632 can track by linking the sensed attribute 314 and the subject-location 320 determined at the second sensor 306 with the movement-pattern 316 sent from the first sensor 304.

The tracking module 632 can use various interfaces, such as the first display interface 530 of FIG. 5 or the second storage interface 548, to access the movement-pattern 316, the behavior-pattern 318, the sensed attribute 314, or a combination thereof. The tracking module 632 can use the first control unit 512, the second control unit 534, or both to link the data and continuously track the movement or the behavior.

The tracking module 632 can also track the movements or behaviors of the sensed attribute 314 between all of the sensors in the sensor network 202 using the sensed attribute 314. The tracking module 632 can compare the sensed attribute 314 from the first sensor 304 and the second sensor 306.

The tracking module 632 can determined the sensed attribute 314 from adjacent sensors as having common physical traits, such as shape, weight or size, when the sensed attribute 314 from the adjacent sensors have similar values. The tracking module 632 can combine the movement pattern 316, the behavior-pattern 318, or both from the adjacent sensors to continuously track people or things within the sensor network 202.

It has been discovered that present invention provides the building management system 100 with continuous detailed observation while guarding member privacy. The combination of the movement-pattern 316, the behavior-pattern 318, the sensed attribute 314 and the tracking module 632 gives rise to the continuous detailed observation while guarding member privacy by continually watching all movements, members, and objects continuously across all of the sensors within the sensor network 202 without sending any information out of the network.

The following module 606 can pass the continually tracked information to the adjustment module 608. The adjustment module 608 is for updating the various models and profiles of the building management system 100 using the currently sensed data. The adjustment module 608 can have an action-update module 634, an optimization module 636, and a type-update module 638 for performing the updates.

The action-update module 634 is for adjusting the occupant profile 322 using the movement-pattern 316, the behavior-pattern 318, the assistance setting 428, or a combination thereof. The action-update module 634 can adjust the movement-profile 326 using the movement-pattern 316 and the behavior-profile 328 using the behavior-pattern 318.

The action-update module 634 can adjust the movement-profile 326 by adding the movement-pattern 316 into the movement-profile 326. The action-update module 634 can add the movement-pattern 316 to the end of the movement-profile 326 to keep track of the sequence of movements for a particular member. The action-update module 634 can also keep the various patterns in the movement-profile 326 according to time.

The action-update module 634 can reset the movement-profile 326 and clear out the values of the movement-pattern 316 in the movement-profile 326 periodically. For example, the action-update module 634 can be predetermined by the software or hardware manufacturer, the service provider, the user, the building management system 100, or a combination thereof to set all the values within the movement-profile 326 at 3:00 am each day. Also, for example, the action-update module 634 can release or delete all dynamic data and set address pointers to NULL value when the particular member shows the behavior-pattern 318 corresponding to sleeping.

The action-update module 634 can use the first control unit 512, the second control unit 534, or both to process the movement-pattern 316 and the movement-profile 326. The action-update module 634 can store the movement-pattern 316 and the movement-profile 326 in the first storage unit 514, the second storage unit 546, or both.

Using similar methods, the action-update module 634 can also adjust and update the identification trait 324. The action-update module 634 can adjust and update the identification trait 324 by determining a threshold for identifying subtle changes, separate from a different threshold for identifying the particular member in the detection module 618.

The action-update module 634 can determine the threshold based on the information in the identification trait 324. The action-update module 634 can use information gathered by the external-data module 614 or use similar methods as the external-data module 614 to gather the average change and growth rate of a population segment having similar traits.

For example, the action-update module 634 can gather or use information regarding an average growth rate typical for a teenage member in the house. Also, for example, the action-update module 634 can gather or use information regarding an average rate of physical changes typical for a pregnant employee.

The action-update module 634 can use the average information as the threshold for updating the identification trait 324, identifying the particular member for the detection module 618, or both. For example, the action-update module 634 can adjust the identification trait 324 if the sensed attribute 314 are within the average of the initial value of the identification trait 324. Also, for example, the detection module 618 can use a threshold level or a factored value of the threshold determined by the action-update module 634 to distinguish amongst the members, and also between members and non-members.

The action-update module 634 can adjust the identification trait 324 by setting the identification trait 324 to the sensed attribute 314. The action-update module 634 can also prompt the particular member to go through initialization procedures similar to ones described for the profile module 612 above to adjust the identification trait 324.

The action-update module 634 can also track the trend and rate in the adjustments to the identification trait 324. For example, the action-update module 634 can keep track of changes in height of the particular member, such as the result of growth or osteoporosis. Also, for example, the action-update module 634 can keep track of changes in weight.

The action-update module 634 can also adjust the behavior-profile 328 with the behavior-pattern 318. The action-update module 634 can adjust the behavior-profile 328 using similar methods as described above for adjusting the identification trait 324 and the movement-profile 326.

The action-update module 634 can also adjust the assistance setting 428. The action-update module 634 can adjust the assistance setting 428 using the updated values of the behavior-profile 328, the identification trait 324, average behavior pattern of similar people, or a combination thereof.

For example, the action-update module 634 can increase a level of involvement for the building management system 100 by changing the assistance setting 428 when the behavior-profile 328 shows that the particular member is slowing down and the identification trait 324 shows that the particular member's age is greater than 65 years. Also, for example, the action-update module 634 can decrease the involvement when the behavior-profile 328 of the particular member shows that the particular member has been adhering to the member-specific response 426 of FIG. 4.

The thresholds for changing the assistance setting 428 can be determined by the action-update module 634 using human behavior models, average behaviors, input from databases, service providers, or a combination thereof. The thresholds can also be predetermined, adjusted, or both by the user, the software or hardware manufacturer, the service provider, the family physician, company health official, the resource supplier 104, or a combination thereof.

The action-update module 634 can pass the updated version of the occupant profile 322, the updated version of the identification trait 324, the trend and rate data regarding the changes in the identification trait 324, or a combination thereof to the optimization module 636. The optimization module 636 can further expand on the level of assistance for the particular member using the occupant profile 322, the behavior-profile 328, the assistance setting 428, or a combination thereof.

Using similar methods as described above, the action-update module 634 can update the template-pattern 319. The action-update module 634 can find new information to adjust the existing values for the template-pattern 319.

For example, the action-update module 634 can periodically perform the methods for initializing the template-pattern 319 as described for the external-data module 614. Also, for example, the action-update module 634 can receive updates for identifying movements, such as movements typical for stages of Alzheimer corresponding to a member or new patterns of security breaches.

The action-update module 634 can also use past data and a member's response to update the template-pattern 319. For example, the member can identify or confirm the recorded data as being suspicious after an intruder is found within or around the managed structure 102. Also, for example, the building management system 100 can update to include the recorded movement patterns preceding a call to the emergency services 110 according to the situation or nature of the emergency.

The optimization module 636 is for calculating the member-optimization model 414 of FIG. 4, the total-optimization model 416, or both. The optimization module 636 can calculate by using the assessment structure 418, the incentive 420 of FIG. 4, the behavioral stimulus 422 of FIG. 4, the total-usage status 406, the member-usage status 402, the member-usage forecast 404, the total-usage forecast 408, or a combination thereof.

The optimization module 636 can calculate the total-optimization model 416 by adjusting the total-usage forecast 408 based on the assessment structure 418. For example, the optimization module 636 can adjust the total-usage forecast 408 by increasing usage where the total-usage forecast 408 has the lowest consumption, decreasing usage where the total-usage forecast 408 has the highest consumption, or both to calculate the total-optimization model 416.

Also, for example, the optimization module 636 can also perform peak detection on the total-usage forecast 408. The optimization module 636 can decrease the usage amounts near each peak to calculate the total-optimization model 416.

For further example, the optimization module 636 can also identify consumption amounts that have a large jump in price within the assessment structure 418. The optimization module 636 can identify regions in the total-usage forecast 408 that have slightly higher consumption amount than the identified areas with large increase in price. The optimization module 636 can lower the consumption levels below the regions having the rapid increase in price to calculate the total-optimization model 416.

The amount of increase or decrease can be proportionate to the amount in the total-usage forecast 408. The amount of increase or decrease can also be designated by the difference in amount to where the assessment structure 418 has a steep decline.

The amounts and the thresholds for determining whether to adjust can be determined by the optimization module 636. The optimization module 636 can determine the threshold levels for finding where to adjust within the total-usage forecast 408 to calculate the total-optimization model 416 by using human behavior models, economic forecast models, predetermined tables and conditions, user inputs, or any combination thereof.

The optimization module 636 can also adjust the total-usage forecast 408 by increasing the resource consumption when the assessment structure 418 is the lowest or below a threshold level and the sensor network 202 has or is connected to the resource-storage 206 of FIG. 2. The optimization module 636 can calculate the total-optimization model 416 by increasing the flow of the resource 210 into the managed structure 102 to be stored in the resource-storage 206 when the price is the cheapest.

The optimization module 636 can adjust the total-usage forecast 408 by decreasing the resource consumption during the peak-period 410 of FIG. 4. The optimization module 636 can also schedule the use of the stored resources in the resource-storage 206 during the peak-period 410. The optimization module 636 can similarly account for the solar panel 204 of FIG. 2.

The optimization module 636 can calculate the member-optimization model 414 by using methods similar to the ones described above. The optimization module 636 can also calculate the member-optimization model 414 using member-specific information, such as the behavior-profile 328 or the identification trait 324 of the corresponding member.

The optimization module 636 can calculate the member-optimization model 414 by using the past behavior as a base line. The optimization module 636 can calculate the member-optimization model 414 by using the behavior-profile 328 as the base line and increasing the behavior-pattern 318 that conserve the resource 210 and decreasing the behavior-pattern 318 that consumes the resource 210.

For example, the optimization module 636 can reduce television viewing time by 5 minutes or turning of the television during commercials. Also, for example, the optimization module 636 can decrease number of lights left on when leaving a room.

The optimization module 636 can calculate the member-optimization model 414 as the behavior-profile 328 having the adjustments described above. The amount and magnitude of the adjustment, as well as the behaviors to adjust can be selected using methods similar to the corresponding methods for the total-optimization model 416 described above.

The optimization module 636 can also calculate the member-optimization model 414 by calculating the behavior-profile 328 having the adjustments into estimates of the amounts of the resource 210 consumed by the behavior-pattern 318 therein. For example, the optimization module 636 can translate each activity, such as showering and using a stove, into units of the resource 210. The optimization module 636 can aggregate the consumption amount per time periods or other units to calculate the member-optimization model 414.

The optimization module 636 can also use the identification trait 324 or feedbacks from the sensor network 202 for data such as user settings or device status to calculate the member-optimization model 414. For example, if a member is older than 65 or if there is an occupant within the managed structure 102, the optimization module 636 can decrease the adjustment magnitude of the temperature.

The adjustment module 608 can pass the results of the action-update module 634, the optimization module 636, or both to the type-update module 638. The type-update module 638 is for adjusting the alert type 330 using the movement-pattern 316, the behavior-pattern 318, the occupant profile 322, the optimization module, or a combination thereof.

The type-update module 638 can adjust the alert type 330 by adjusting the detection standard 342, the response protocol 344, the system response 424 of FIG. 4, the member-specific response 426, or a combination thereof. For example, the type-update module 638 can adjust the detection standard 342 for the health-emergency alert 334 to include elderly fall patterns when the occupant profile 322 shows that a member of the managed structure 102 is elderly and the member's movements are slowing down.

Also, for example, the type-update module 638 can adjust the detection standard 342 for the intrusion alarm 332 to account for friends of a minor child in a family. The type-update module 638 can adjust the response protocol 344 to notifying designated member and not the emergency service 110 based on the behavior-pattern 318 of the minor child.

The type-update module 638 can also adjust the system response 424, the member-specific response 426, or both. The type-update module 638 can set the member-specific response 426 or the system response 424 as the response protocol 344 for the conservation notice 340 and the member-optimization model 414 or the total-optimization model 416 as the detection standard 342. The type-update module 638 can adjust the conservation notice 340 using similar methods as described above.

For example, the type-update module 638 can ignore the system response 424, the member-specific response 426 when the sensed attribute 314, the movement-profile 326, the behavior-profile 328, or a combination thereof indicates large number of non-members and numerous movements typical of a party. Also, for example, the type-update module 638 can adjust the member-specific response 426 as a member's habits change and the member-optimization model 414 changes.

The type-update module 638 can also update the alert type 330 based on the occurrence of all or part of the response protocol 344. For example, the type-update module 638 can establish the movement pattern 314, the behavior-pattern 318, or both preceding a call by one of the members to the emergency service 110 as a new or updated value of the detection standard 342 for the corresponding alert type. The type-update module 638 can determine the corresponding alert type through user input, type of personnel responding to the call, or external input.

The type-update module 638 can use the first control unit 512, the second control unit 534, or both to process the data and make the adjustments. The type-update module 638 can store the results in the first storage unit 514, the second storage unit 546, or both.

It has been discovered that the present invention provides the building management system 100 with adaptive and personally tailored conservation of the resource 210. The combination of the type-update module 638, the conservation notice 340, the member-specific response 426, the system response 424, the member-optimization model 414, and the total-optimization model 416 gives rise to the adaptive and personally tailored conservation by constantly monitoring a member's behavior and updating the ways to optimize the consumption of the resource 210 as the behavior occurs.

The adjustment module 608 can pass the results of the updates and adjustments to the reaction module 610. The reaction module 610 is for determining whether the movement-pattern 316 or the behavior-pattern 318 matches the alert type 330 and to take appropriate actions based on the determination. The reaction module 610 can have an emergency-protocol module 640 and a daily-routine module 642 for determining and taking actions.

The emergency-protocol module 640 is for determining and responding to emergency situations. The emergency-protocol module can determine whether an emergency situation is occurring by comparing the movement-pattern 316, the behavior-pattern 318, or both to the detection standard 342 of the intrusion alarm 332, the health-emergency alert 334, the structural-danger alert 336, or a combination thereof.

The emergency-protocol module 640 can determine that the alert type 330 is occurring when the movement-pattern 316, the behavior-pattern 318, or matches the detection standard 342. When a match is determined, the emergency-protocol module 640 can follow the actions specified in the response protocol 344. For example, the emergency-protocol module 640 can notify the emergency service 110 when the behavior-pattern 318 matches the alert type 330, transmit the subject-location 320 to the emergency service 110, or both.

As a more specific example, the emergency-protocol module 640 can contact member A, and if no password is received within 5 minutes, to contact the emergency service 110 and store the sensed attribute 314, the movement-pattern 316, and the behavior-pattern 318 of an intruder. Also, for example, the emergency-protocol module 640 can set off a fire alarm, an automatic suppression system, and contact the emergency service 110 when a structural fire is determined.

The daily-routine module 642 is for determining and responding to non-emergency situations. The daily-routine module 642 can determine and respond to non-emergency situation using similar methods for responding to emergency situations above. For example, the daily-routine module 642 can apply the determination and response to the wellness notice 338, the conservation notice 340, or both.

As a more specific example, the daily-routine module 642 can control the consumption of the resource 210 when the behavior-pattern 318 matches the alert type 330 by controlling devices or systems, such as the solar panel 204, the resource-storage 206, the heating or cooling system, the television, or a combination thereof. The daily-routine module 642 can control the consumption by notifying one or more members according to the response protocol 344.

The reaction module 610, the emergency-protocol module 640, and the daily-routine module 642 can use the first control unit 512, the second control unit 534 to process, compare, and determine the situation. The modules can use the first regulator unit 520, the second regulator unit 552, the first communication unit 516, the second communication unit 536, or a combination thereof to follow the response protocol 344.

All of the modules in the building management system 100 can be configured differently. The different configurations can be exemplified by the reaction module 610, the emergency-protocol module 640, and the daily-routine module 642.

The functions of the modules and the sub-modules can be shared differently. For example, the reaction module 610 can make the determination of whether the alert type 330 is occurring by comparing the movement-pattern 316, the behavior-pattern 318 or both with all instances of the alert type 330. The emergency-protocol module 640 can follow the response protocol 344 in emergency situations and the daily-routine module 642 can follow the response protocol 344 in non-emergency situations.

Also, for example, the reaction module 610, the emergency-protocol module 640, and the daily-routine module 642 can all be located in the first sensor 304, the second sensor 306, or distributed within the sensor network 202. Alternatively, the reaction module 610 and the daily-routine module 642 can be located in the sensor network 202 and the emergency-protocol module 640 can be located in the central-manager 208.

Furthermore, all of the modules in the building management system 100 can be a hardware implementation. For example, one or more of the modules can be a hardware accelerator within the first control unit 512, the second control unit 534, or both. Also, for example, the modules can be a hardware implementation outside of the control units in the first sensor 304, the second sensor 306, the sensor network 202, the central-manager 208, or a combination thereof.

The physical transformation of the occupant profile 322, such as the detection of the changes in the identification trait 324 or the adjustments of the behavior-profile 328, results in movement in the physical world, such as a member being notified of dangerous weight loss or turning lights off for the member forgets to do when leaving the room. The movement of the people resulting in different behavior, such as changing habits or behaviors to conserve or healthy weight loss, can be fed back to the to the building management system 100 to further operate the building management system 100, such as the adjustment to the occupant profile 322 or the response protocol 344.

Figure 7:
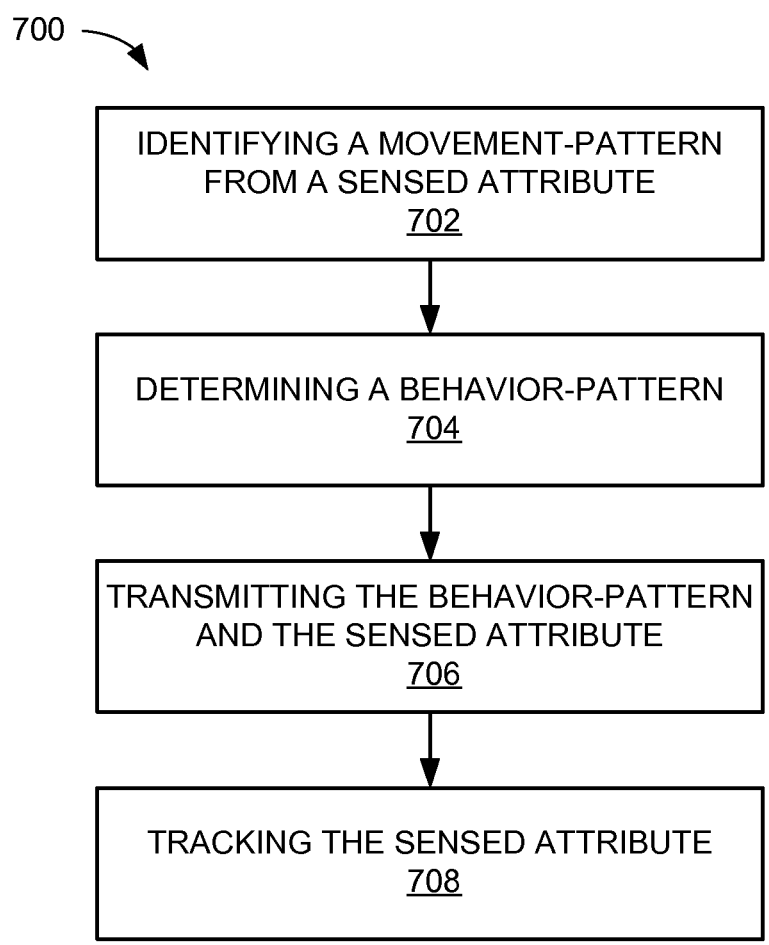
FIG. 7 is a flow chart of a method of operation of the building management system in a further embodiment of the present invention.

Referring now to FIG. 7, therein is shown a flow chart of a method 700 of operation of the building management system 100 in a further embodiment of the present invention. The method 700 includes: identifying a movement-pattern from a sensed attribute at a first sensor in a block 702; determining a behavior-pattern at the first sensor when the movement-pattern matches a template-pattern in a block 704; transmitting the behavior-pattern and the sensed attribute from the first sensor to a second sensor in a block 706; and tracking the sensed attribute at the second sensor for displaying on a device in a block 708.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the building management system of the present invention furnishes important and heretofore unknown and unavailable solutions, capabilities, and functional aspects for improving reliability in systems, well-beings and quality of life of its occupants. The resulting processes and configurations are straightforward, cost-effective, uncomplicated, highly versatile, and effective, can be implemented by adapting known technologies, and are thus readily suited for efficiently and economically manufacturing building management system.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for operating a building management system comprising:
   identifying a movement-pattern from a sensed attribute at a first sensor;
   determining a behavior-pattern at the first sensor when the movement-pattern matches a template-pattern. wherein the behavior-pattern is a recognized set of the movement-patterns associated with a specific meaning;
   transmitting the behavior-pattern and the sensed attribute from the first sensor to a second sensor; and
   tracking the sensed attribute at the second sensor for displaying on a device.

2. The method as claimed in claim 1 further comprising:
   establishing a movement-profile; and
   adjusting the movement-profile using the movement-pattern.

3. The method as claimed in claim 1 further comprising:
   establishing a behavior-profile; and
   adjusting the behavior-profile using the behavior-pattern.

4. The method as claimed in claim 1 further comprising:
   calculating a subject-location using the movement-pattern; and
   transmitting the subject-location according to a response protocol.

5. The method as claimed in claim 1 further comprising:
   establishing an occupant profile; and
   adjusting the occupant profile using the movement-pattern, the behavior-pattern, or a combination thereof.

6. A method of operating a building management system comprising:
   identifying a movement-pattern from a sensed attribute at a first sensor for comparing against the alert type;
   determining a behavior-pattern at the first sensor when the movement-pattern matches a template-pattern, wherein the behavior-pattern is a recognized set of the movement-patterns associated with a specific meaning;
   transmitting the behavior-pattern and the sensed attribute from the first sensor to a second sensor;
   tracking the behavior-pattern and the sensed attribute at the second sensor for displaying on a device; and
   establishing an alert type for comparing against the behavior-pattern.

7. The method as claimed in claim 6 further comprising:
   receiving an assessment structure; and
   establishing a member-specific response using the assessment structure.

8. The method as claimed in claim 6 further comprising adjusting the alert type using the movement-pattern, the behavior-pattern, or both.

9. The method as claimed in claim 6 further comprising implementing a response protocol when the behavior-pattern matches the alert type.

10. The method as claimed in claim 6 further comprising controlling the consumption of a resource when the behavior-pattern matches the alert type.

11. A building management system comprising:
    a detection module for identifying a movement-pattern from a sensed attribute at a first sensor;
    an activity analysis module, coupled to the detection module, for determining a behavior-pattern at the first sensor when the movement-pattern matches a template-pattern, wherein the behavior-pattern is a recognized set of the movement-patterns associated with a specific meaning;
    a sending module, coupled to the activity analysis module, for transmitting the behavior-pattern and the sensed attribute from the first sensor to a second sensor; and
    a tracking module, coupled to the detection module, for tracking the sensed attribute at the second sensor for displaying on a device.

12. The system as claimed in claim 11 further comprising:
    a profile module, coupled to the detection module, for establishing a movement-profile; and
    an action-update module, coupled to the detection module, for adjusting the movement-profile using the movement-pattern.

13. The system as claimed in claim 11 further comprising:
    an profile module, coupled to the detection module, for establishing a behavior-profile; and
    an action-update module, coupled to the detection module, for adjusting the behavior-profile using the behavior-pattern.

14. The system as claimed in claim 11 further comprising:
a locating module, coupled to the detection module, for calculating a subject-location using the movement-pattern; and
an emergency-protocol module, coupled to the tracking module, for transmitting the subject-location according to a response protocol.

15. The system as claimed in claim 11 further comprising:
an profile module, coupled to the detection module, for establishing an occupant profile; and
an action-update module, coupled to the detection module, for adjusting the occupant profile using the movement-pattern, the behavior-pattern, or both.

16. The system as claimed in claim 11 further comprising:
a situation set-up module, coupled to the detection module, for establishing an alert type for comparing against the behavior-pattern; and wherein:
the detection module is for identifying the movement-pattern from the sensed attribute at the first sensor for comparing against the alert type.

17. The system as claimed in claim 16 further comprising:
an external-data module, coupled to the detection module, for receiving an assessment structure; and wherein:
the situation set-up module is for establishing a member-specific response using the assessment structure.

18. The system as claimed in claim 16 further comprising a type-update module, coupled to the detection module, for adjusting the alert type using the movement-pattern, the behavior-pattern, or a combination thereof.

19. The system as claimed in claim 16 further comprising an emergency-protocol module, coupled to the tracking module, for implementing a response protocol when the behavior-pattern matches the alert type.

20. The system as claimed in claim 16 further comprising a daily-routine module, coupled to the tracking module, for controlling the consumption of a resource when the behavior-pattern matches the alert type.

* * * * *